(12) United States Patent
Holt et al.

(10) Patent No.: US 6,422,795 B2
(45) Date of Patent: *Jul. 23, 2002

(54) CARGO LASH TO BAR

(76) Inventors: Anthony J. Holt, P.O. Box 504, Silverdale, WA (US) 98383; Virgil Shawn Elkinton, 1518 10th St., Bremerton, WA (US) 98337

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/231,267

(22) Filed: Jan. 15, 1999

Related U.S. Application Data
(60) Provisional application No. 60/071,648, filed on Jan. 16, 1998.

(51) Int. Cl.[7] ............................................. B60P 7/08
(52) U.S. Cl. .................... 410/115; 410/96; 410/82; 410/101; 410/102; 410/103
(58) Field of Search .................. 410/82, 96, 97, 410/100, 101, 102, 103, 106, 115; 24/287, 265 CD; 114/218; 248/499

(56) References Cited

U.S. PATENT DOCUMENTS

| | | | | |
|---|---|---|---|---|
| 3,159,111 A | * | 12/1964 | Gutridge et al. | 410/82 X |
| 3,618,999 A | | 11/1971 | Emil | |
| 3,680,711 A | | 8/1972 | Brucker | |
| 3,860,209 A | | 1/1975 | Strecker | |
| 4,329,935 A | | 5/1982 | Jonasson | |
| 4,369,009 A | * | 1/1983 | Fulford | 410/35 |
| 4,457,650 A | | 7/1984 | Tseng | 410/111 |
| 4,464,089 A | | 8/1984 | Allen | 410/97 |
| 4,537,540 A | * | 8/1985 | Boughton | 410/82 |
| 4,645,392 A | * | 2/1987 | Takaguchi | 410/80 |
| 4,655,153 A | | 4/1987 | Bel | |
| 5,160,224 A | | 11/1992 | Schwiebert | 410/82 |
| 5,183,375 A | * | 2/1993 | Fenton et al. | 410/35 |
| 5,302,064 A | * | 4/1994 | Davis | 410/115 |
| 5,398,832 A | | 3/1995 | Clive-Smith | |
| 5,445,482 A | * | 8/1995 | Davis | 410/115 |
| 5,516,245 A | * | 5/1996 | Cassidy | 410/101 |
| 5,791,844 A | * | 8/1998 | Anderson | 410/103 |
| 6,027,291 A | * | 2/2000 | Sain et al. | 410/35 |

OTHER PUBLICATIONS

MTMCTEA REF 97–55–22, Oct. 1996 'Marine Lifting and Lashing Handbook', p.3–4 and 3–5, p. 1–1 & 1–2, p. 6–5 & C–1–2.

ISO 668–1979 (E)'79 p. 1–4.3, Series 1.

10138ADA (Dwg)3/98 Holt Industries 'Clover Leaf Mount Twist Lock'.

1998 'Mariner's Annual' p.62–98, 122–98, 123–98 p. 53–98, 58–98, 54–98, 55–98, 60–98, 61–98.

MTMCTEA REF 98–55–21 "Lifting and Tiedown of U.S. Military Helicopters for Marine Transport" p. B–3, B–4, & B–5.

"Merchant Marine Officers" Handbook William B. Hayler, Editor 1989 p. 264 & 265.

* cited by examiner

*Primary Examiner*—Stephen T. Gordon
(74) *Attorney, Agent, or Firm*—Mark Zovko

(57) ABSTRACT

A new piece of cargo lashing gear is provided which is a load transmitting beam of rectangular structural tubing or other shape having multiple D-rings or other lashing apertures along its length for lashing cargo to the deck of a roll-on roll-off ship through the beam, with indexed aperture connections at each end for removably connecting the apparatus to the ship's deck using a pair of twist locks. With the apparatus, cargo lashing schemes with tighter packing of cargo and faster, more accurate, and safer stevedoring operations are effected according to shoreside prestowage plans. Top and bottom mounting points for twist locks allow easy storage, transport, and shoring.

19 Claims, 33 Drawing Sheets

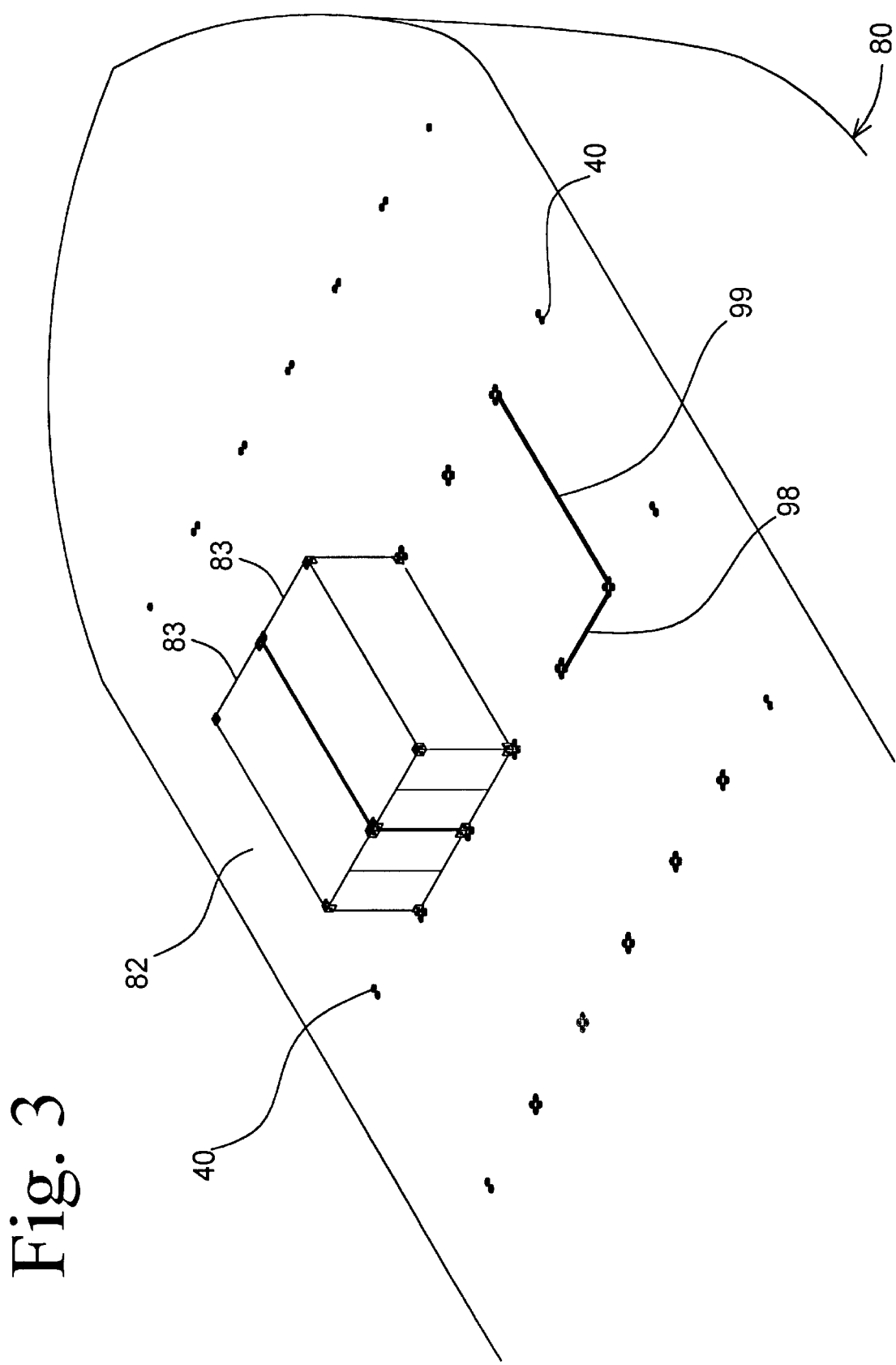

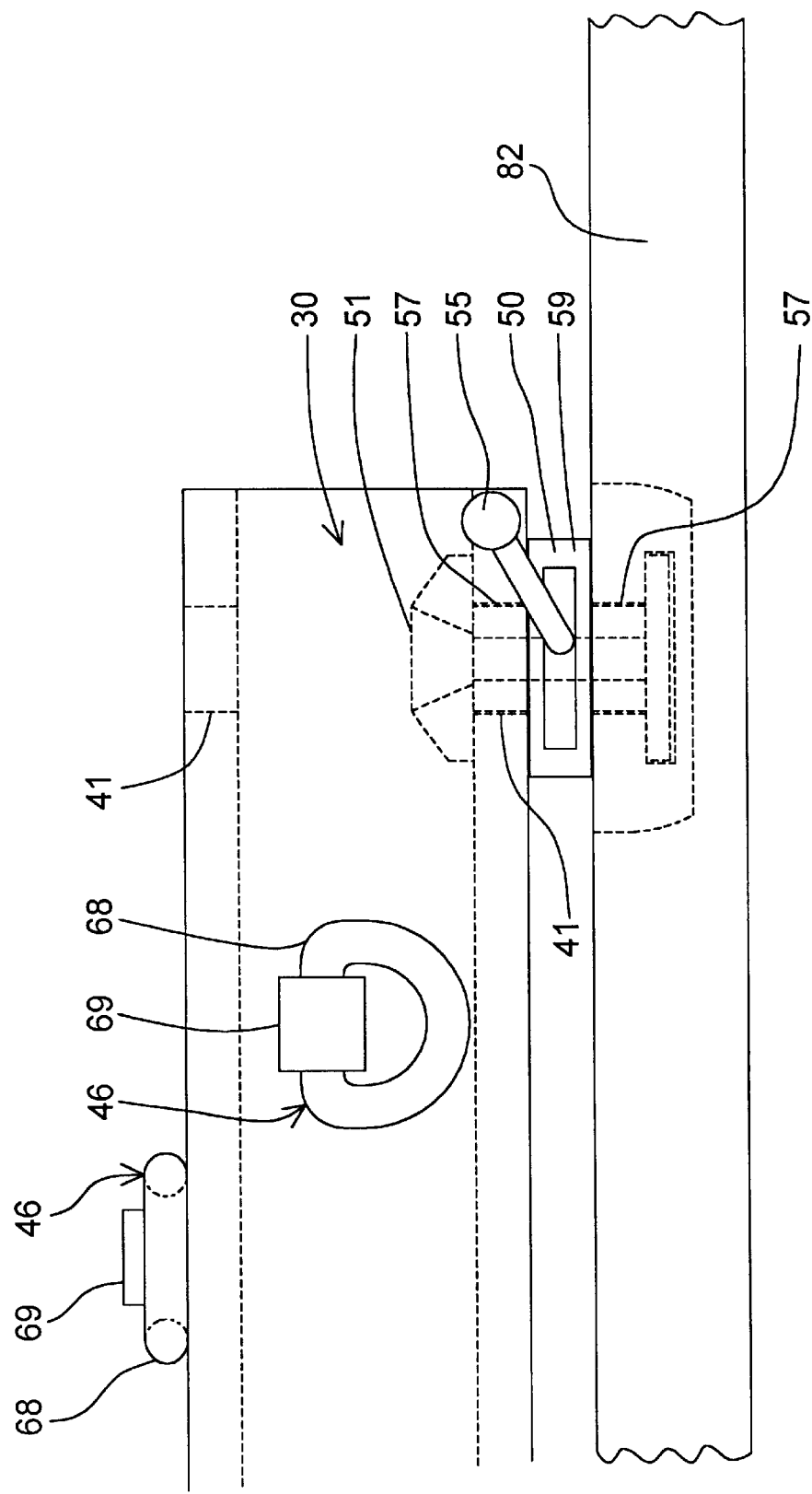

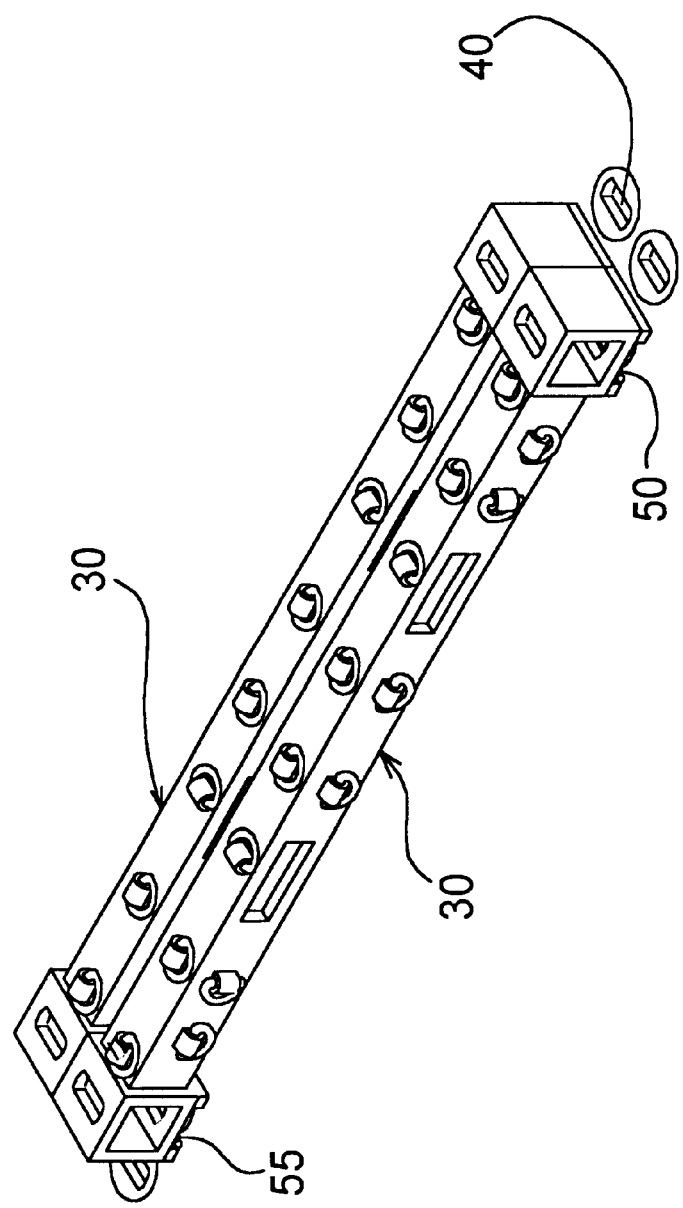

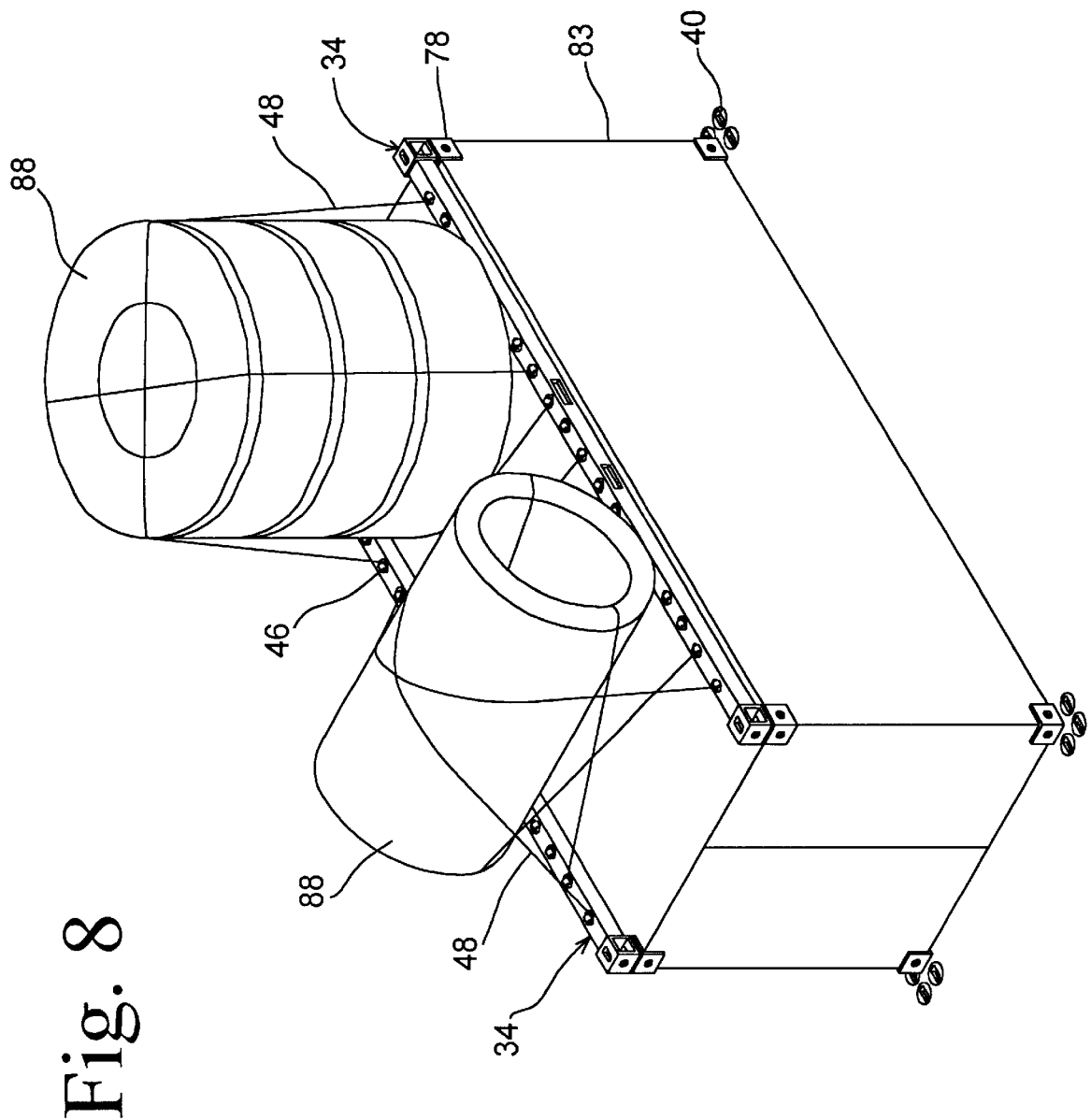

CARGO LASH TO BAR

This application claims the benefit of Provisional patent application Ser. No. 60/071,648 filed Jan. 16, 1998.

CROSS REFERENCE OF RELATED APPLICATIONS

Not Applicable.

STATEMENT REGARDING FEDERALLY SPONSORED RESEARCH AND DEVELOPMENT

Not Applicable

BACKGROUND OF INVENTION

1. Field of the Invention

The present invention relates to an apparatus, a bar which is a beam to lash cargo to, herein called the cargo lash to bar, for fastening and restraining cargo to a transport vessel or vehicle, especially as used in lashing down mobile equipment to the deck of an intermodal cargo carrying roll-on/roll-off ocean going ship known as a RoRo, or for fastening to a tanker ship's weather deck.

2. Description of Related Art

The transportation of cargo is increasingly geared to intermodal and unitized handling. Most ships are equipped for intermodal shipping that consists primarily of freight containers that are eight feet high, eight feet wide, and twenty feet long. This standard is referred to as a TEU or twenty foot equivalent unit and is particularly evident in the international ISO 668 specification. Many variety of containers, and flatracks have been developed for transport of lumber and liquid tanks, and are just two examples of intermodal freight handling equipment that maintain the TEU although height of specialty containers frequently varies. The intermodal nature of freight containers makes them readily usable without adaptation or modification for transport over sea, over land by trucking, or by rail. Mobile equipment and other break bulk cargo are frequently transported on vessels designed to carry intermodal cargo.

Currently when an armored tank or other irregular shaped mobile equipment is loaded on the deck of a ship which is designed for a variety of cargo including intermodal freight containers, the mobile equipment will be chained down and connected to a socket in the deck. Current cargo restraint lashing rigging consists of D-rings welded to a ship's deck and D-rings welded to twist lock bases, breech bases, clover leaf bases, dovetail bases or other commercially available or proprietary locking mounting bases for mounting a lashing line to corresponding deck sockets. U.S. Pat. Nos. 4,457,650 and 3,860,209 illustrate the styles of fastening rings, cavities, and sockets and the various bases types which are used to fasten to a ship's deck. All of these embodiments suffer from the same problem, that they mount and seat into the sockets built into the deck that are spaced too far apart for convenient, safe, and secure Spacing of these sockets is usually substantially twenty feet (or forty feet) apart fore and aft and two adjacent eight feet across athwartship in a configuration reciprocal to the mounting of an intermodal freight container. As a result the cargomen who are stevedores, longshoremen, and ship's crew are frequently faced with the problem on the ship of inadequate tie down locations adjacent to the designated fastening points of most mobile equipment. The result is multiple chains being stretched at odd angles to reach a single mounting location on the deck. This aggravates the problems of lashing and can lead to lashing gear, D-ring, or deck sockets and bases breaking or tearing with the equipment dangerously coming loose at sea. Often the twist lock sockets or D-rings are covered by cargo or wheels or tracks of a piece of mobile equipment, which must be accommodated by lashing to a farther point and putting extra shear load on a neighboring D-ring or omitting a lashing entirely.

In some locations on ships, D-rings are welded to a ship's deck generating different problems. Welding to the deck is a permanent attachment which can be an encumbrance later on and be an obstruction for man and machines that causes a safety hazard. Also, dragging a welder and all of it's equipment around a ship's deck to weld down and retrofit individual D-rings or repair broken D-rings is slow and labor intensive. Welding is a severe optical hazard to ship's crew about the deck. Welding also heats the metal of the deck in excess of 3,000 degrees F., which causes localized changes in the crystal structure of the base metal making it brittle and reducing the strength. A ship's deck cannot be readily annealed. Weld on D-rings are not able to be welded to the lower deck of most ships because the bottom side of the lower deck is the fuel hold or fuel tank. To weld to the lower deck requires the costly procedure of evacuating the space with an inert gas or risking major fire or explosion.

The erectable secondary deck shown in U.S. Pat. No. 4,329,935 of Jonasson using twist locks and taking advantage of the regular spacing of twist lock mounting apertures in the deck of a ship displays the practicality of the present invention to take advantage of the same regularly ordered twist lock socket apertures.

Folding flatracks of the type shown in U.S. Pat. No. 5,398,832 of Clive-Smith reveal the great need for versatile lashing of cargo so that cargo will securely endure a voyage aboard a waterborne vessel. Clive-Smith discloses an improved flatrack with d-rings for lashing cargo to keep a load fastened to the flatrack wherein the lashing chain begins, ends, and is brought taught by a binder as an internal force to the flatrack. That is to say that cargo native to the flatrack is held fast to the flatrack. The present invention on the other hand provides a new cargo lashing apparatus for lashing cargo to which has a completely different mode of functionality from Clive-Smith, wherein an external force is applied to the apparatus of the present invention and an object external to the cargo lash to bar is restrained to the deck of a ship. Clive-Smith is beneficial to the understanding of the great difficulty in facilitating the safe and secure arrival of cargo aboard the modern intermodal ships. These are new solutions to the broad array of challenges that shippers face in these days of intermodal cargo movement.

The versatility of the twist lock sockets apertures at their respective regular spacing as an erection attachment point is further evidenced by the novel portable hand rail of Bel, U.S. Pat. No. 4,655,153. As with the previous citation, the preponderance of examples show that the deck sockets can be utilized far beyond simple freight containers. All these however fail to grasp the enormity of the advantage to be gained in cargo fastening, restraining, and securing of the present invention.

People in the mobile equipment shipping industry are clear, there is a lot of money being spent shoreside for load preplanning and logistical processes to make efficient stowage but when mobile equipment cargo arrives onboard the ship it is not loaded according to the plan because of the impediments of the use of old style lashing gear exacerbating the problems of inadequate deck tie down lashing points.

That serious difficulty of consistent, safe, and secure lashing of mobile equipment cargo is clearly enunciated in U.S. MTMCTEA Ref 97-55-22 Marine Lifting and Lashing Handbook on page 1-1, which says, "As we saw during Desert Shield/Storm, this often leads to inconsistent and excessive lashing procedures that wastes time, money, and manpower hours".

BRIEF SUMMARY OF THE INVENTION

The cargo lash to bar is a beam which is a continuous structural member that can be fastened and unfastened to a ship's deck and quickly handled aboard a ship to facilitate multiple convenient and accessible lashing point apertures along the length of the span of the member to ensure secure cargo lashing and restraining especially of irregular shaped loads. The key to the application of the present invention is the use of standard twist lock bolt connections. Such twist locks are commercially available in a variety of mounting base configurations. The cargo lash to bar is constructed to use a standard twist lock rotating locking bolt connections at each end of the bar for releasable locking to its mounting locking surface. These twist locks are an integral part of a RoRo ship's current inventory of lashing gear. The cargo lash to bar comes with the mounting apertures in its mounting locking surface on the bottom, that receive the twist lock body and rotating locking bolt.

The result is a versatile new piece of cargo lashing gear. Accordingly, several objects and advantages of the present invention are: a) the primary object of the cargo lash to bar invention is to provide to ships and other cargo transport vehicles or handlers a device that speeds up the loading and deployment of irregular shaped cargo and mobile equipment by aiding their task of securing a load by providing a structural member to attach to with lashing aperture locations heretofore unavailable along the entire length between typical deck mounting sockets, b) a further advantage to the use of the cargo lash to bar is that more D-rings and aperture holes for lashing makes for less overloaded rings which provides security from losing multiple pieces of mobile equipment at sea adding a safety benefit to the crew tasked with resecuring a loose load, c) a further advantage of the lash to bar is that if the lashings break loose on a piece of mobile equipment cargo by fraying or other means, the beam will act as dunnage to restrict movement reducing potential damage to a ship and adjacent cargo, d) a further advantage of the cargo lash to bar is the extensive use of D-rings which have a smooth contoured surface that can be used with chains, cable, hemp rope, or especially light weight and high strength nylon and kevlar synthetic fibrous straps or webbing, e) a further advantage to the use of the cargo lash to bar is that it allows the stevedores to make a more systematic approach to the deck location of mobile equipment and actually position equipment according to the shoreside prestowage plan, f) a further advantage is the simplification of load positioning for consistent repeatable lashing of mobile equipment, g) a further advantage is reclamation of deck space previously occupied by flailed lashings allowing a ship to carry more cargo, h) a further advantage to the use of the cargo lash to bar when it lays fore to aft across the twenty foot span of a ships deck spanning deck fastening twist lock sockets, mobile equipment can readily be loaded in between a pair of cargo lash to bars like driving a car into a stall in a striped asphalt parking lot since most mobile equipment is loaded on a RoRo fore and aft in the same orientation as a container, i) a further object of the cargo lash to bar is to provide a new means to assist the ordinary lashing of standard containers attached one on top of another by placing a cargo lash to bar under the end of a bottom container to lash the upper containers freeing up the valuable deck space which previously required using heavy and cumbersome lashing bars and associated lashing gear, j) a further advantage is to remove the hazard of welding on a ship's deck and facilitate welding repairs at a safe location, even by off-ship contractors, k) a further advantage is the ability to use the cargo lash to bar as a safe article on which to weld fasteners for restraining irregular cargo to the lower deck of a ship immediately above a fuel tank or a fuel soaked wooden deck, l) a further advantage of the cargo lash to bar is use as a shoring beam by itself or with multiple lash to bars stacked on top of the other, m) a further advantage of the cargo lash to bar is to use a pair of the apparatus for supporting or securing cargo above a clear span over a hatch or damaged portion of a ships deck, n) a further advantage is the ability to deploy a pair of cargo lash to bars to utilize space on top of a container, or stack of containers, or stowage flat rack even while the container is being drawn by a semi truck, or rail car, o) a further object of the cargo lash to bar is a lashing apparatus that can be readily stacked one on top of another for unitized storage when this is a desirable feature, p) a further object of the cargo lash to bar is a member that can be manipulated and moved securely and quickly by a fork lift truck, q) a further advantage of the lash to bar is the ability to keep mobile equipment cargo separated far enough apart for a person to walk between the mobile cargo especially during the stevedoring loading process to allow access from front to back of a ship to tend to cargo while a ship is at sea to access the distant areas of a loaded cargo hold in case of medical emergency or fire.

Further objects and advantages of the present invention will become apparent from a consideration of the drawings and ensuing description.

BRIEF DESCRIPTION OF SEVERAL VIEWS OF THE DRAWINGS:

In the drawings, closely related figures have the same number but different alphabetic suffixes.

FIG. 3 is a partial perspective view of the bow of a ship showing the layout of deck sockets.

FIG. 4A is a perspective view of a twist lock and a corresponding deck mount socket, while

FIG. 5 is a front elevation view of the present invention attached to a structure.

FIG. 6B is a perspective view of two of the present invention sitting side by side also to show how they fit adjacent each other without interfering or contacting each other.

FIG. 8 is a perspective view of a container mounted to a ship's deck with the present invention installed on top of the container and cargo lashed to the present invention.

Figure 2:
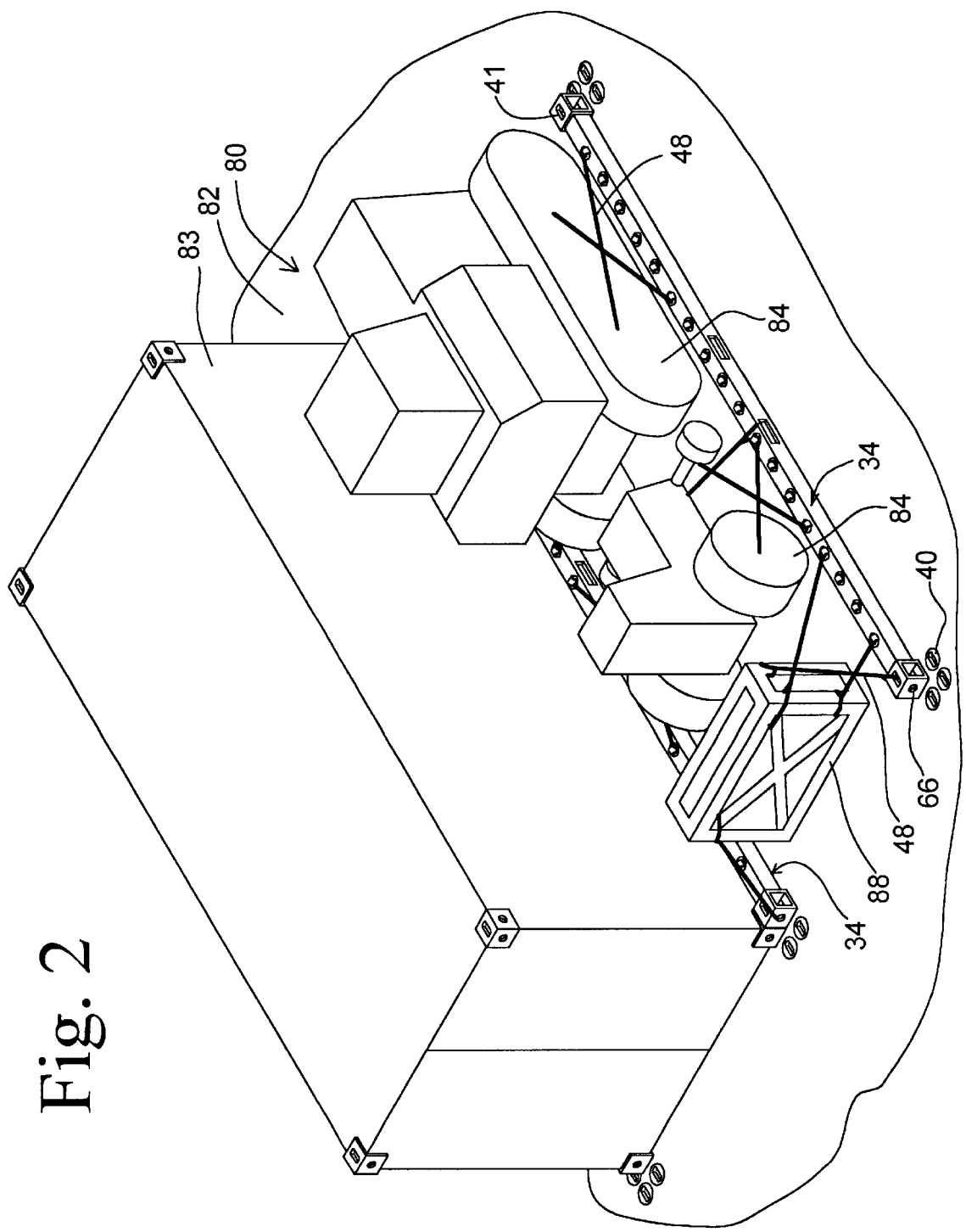
FIG. 2 is a perspective view of two apparatus of the present invention with cargo restrained and secured accordingly alongside a container.
Figure 6A:
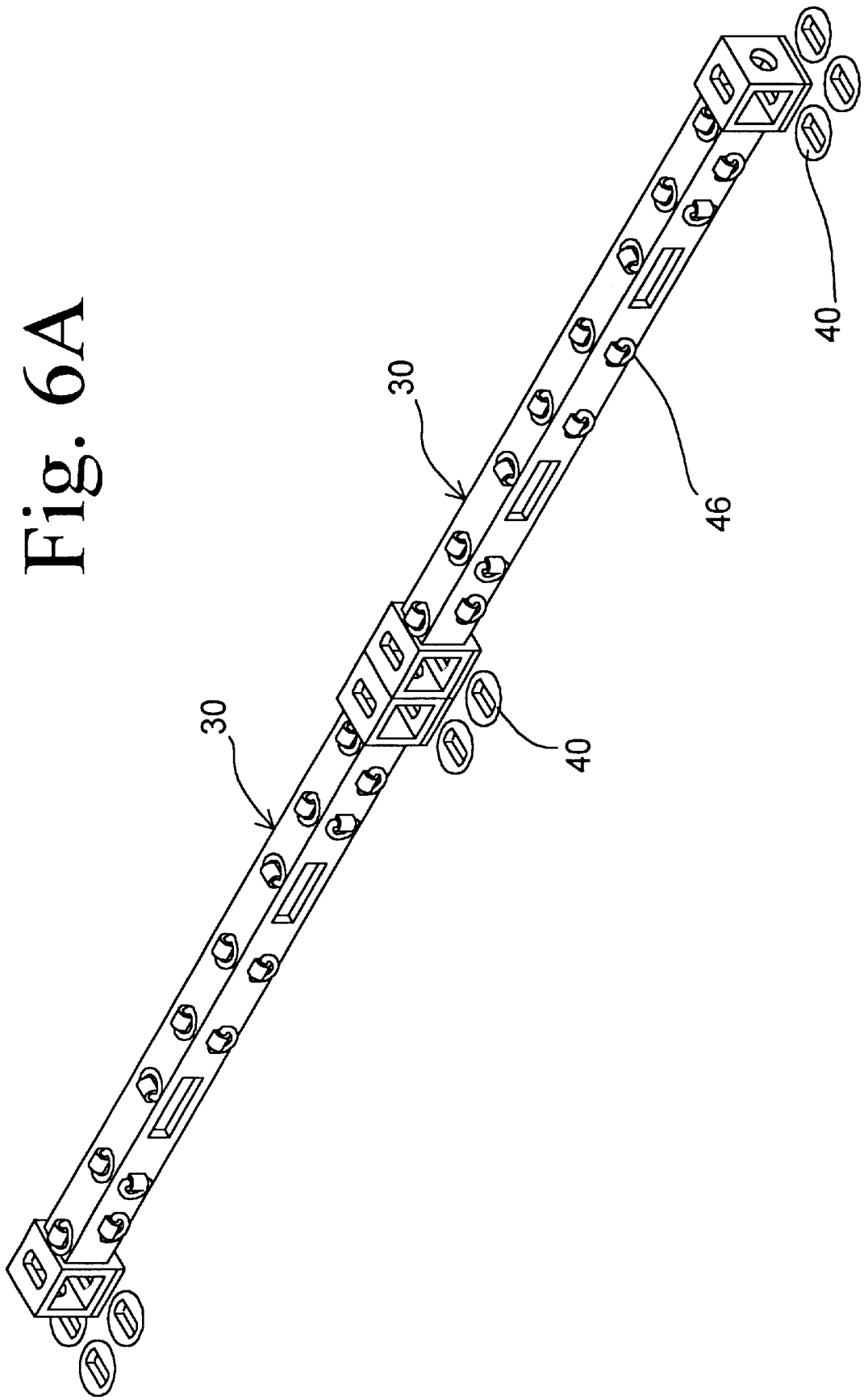
FIG. 6A is a perspective view of two of the present invention sitting end to end along their length to show how they fit adjacent each other without interfering or contacting each other.
Figure 6C:
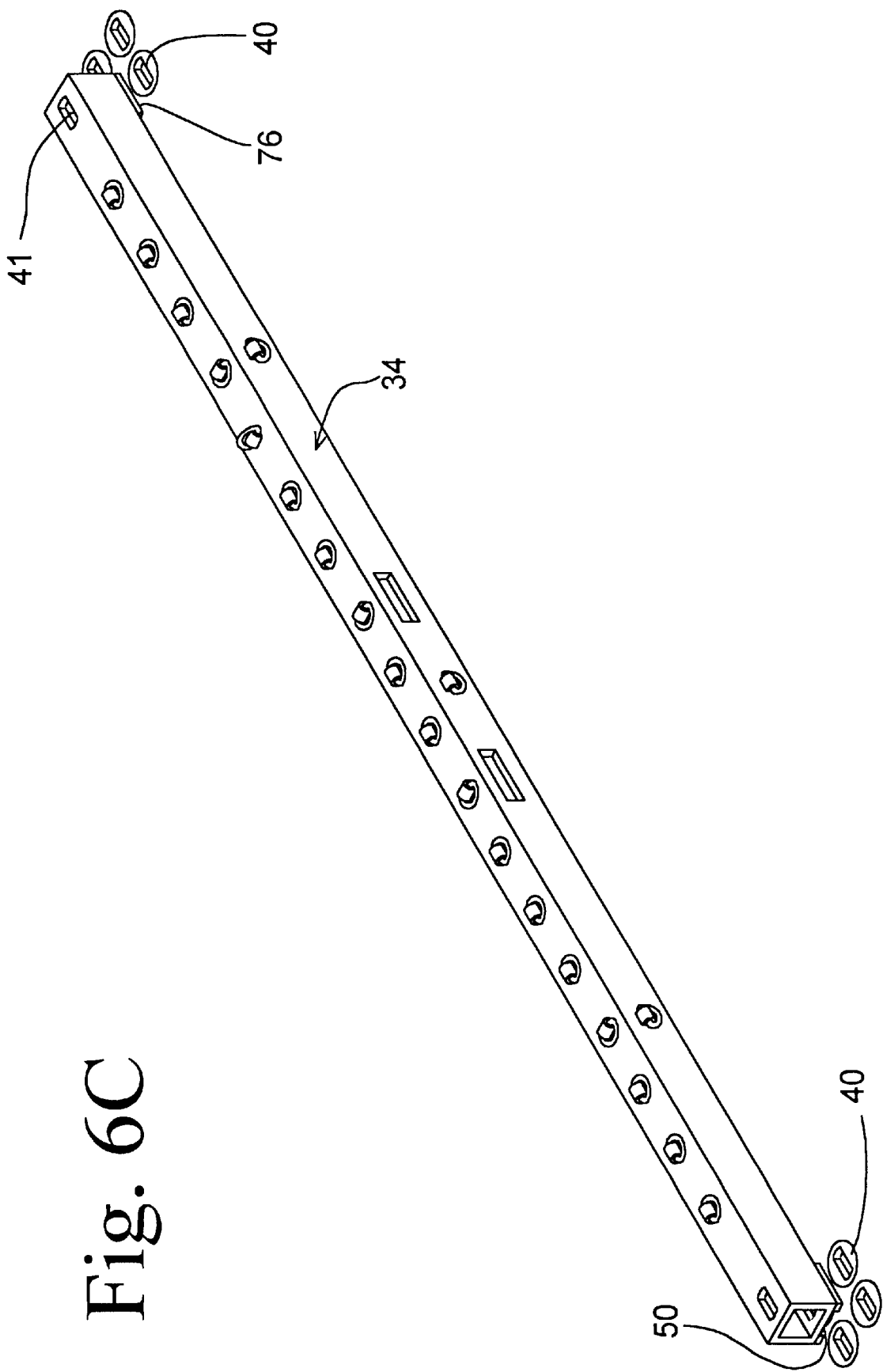
FIG. 6C is a perspective view of the preferred embodiment of the present invention.
Figure 6D:
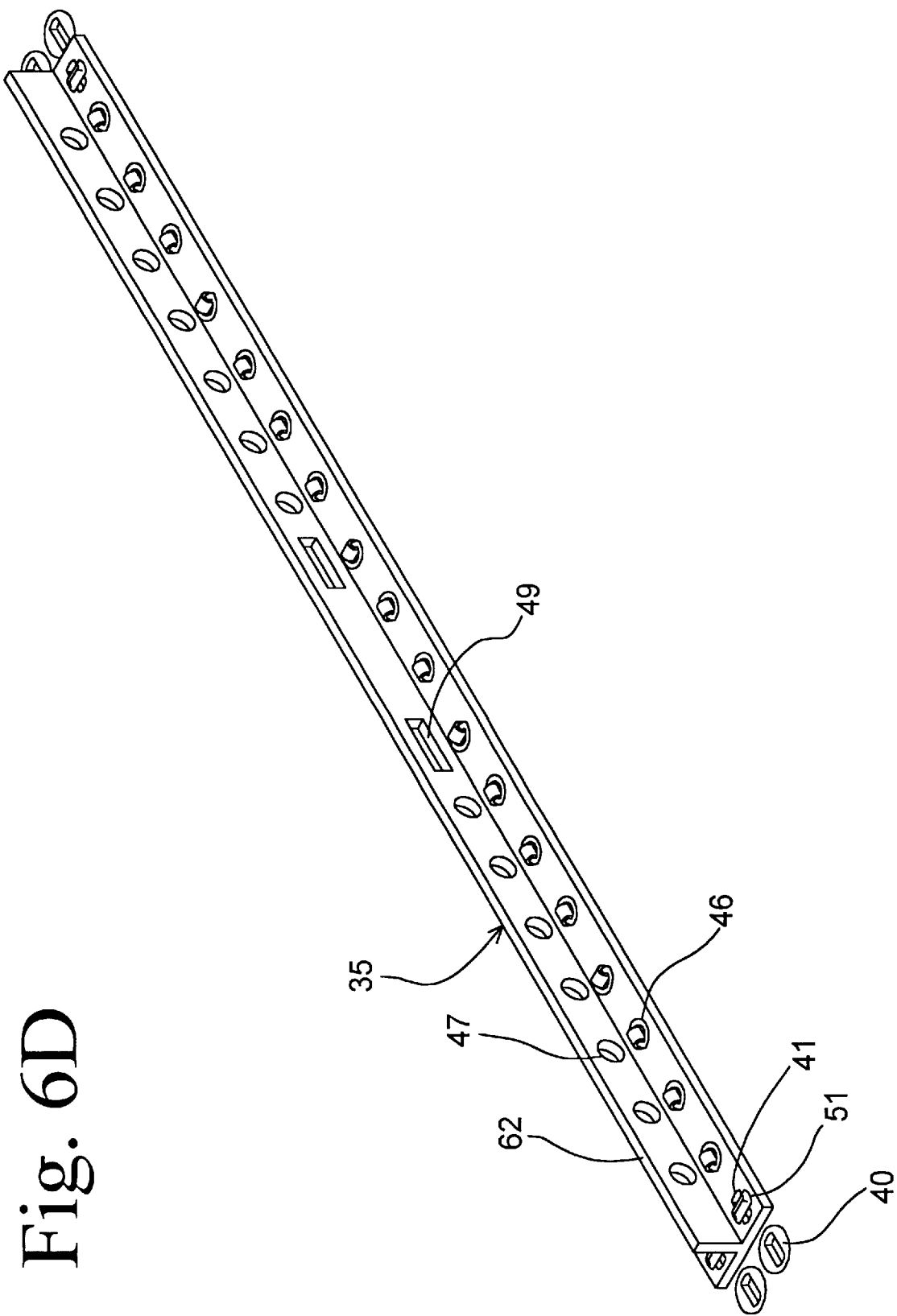
FIG. 6D and FIG. 6E are perspective views of embodiments of the invention.
Figure 6E:
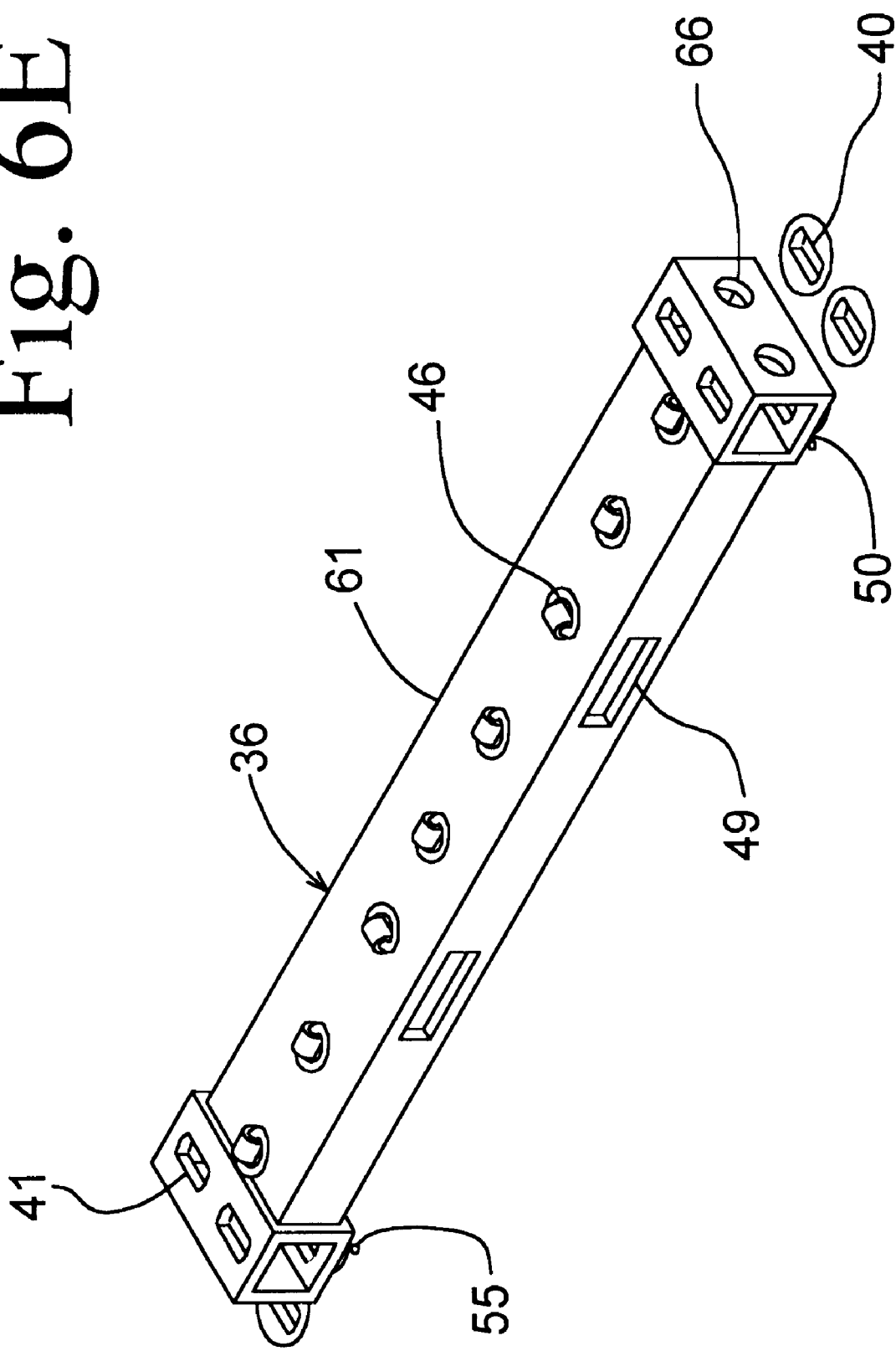
Figure 17:
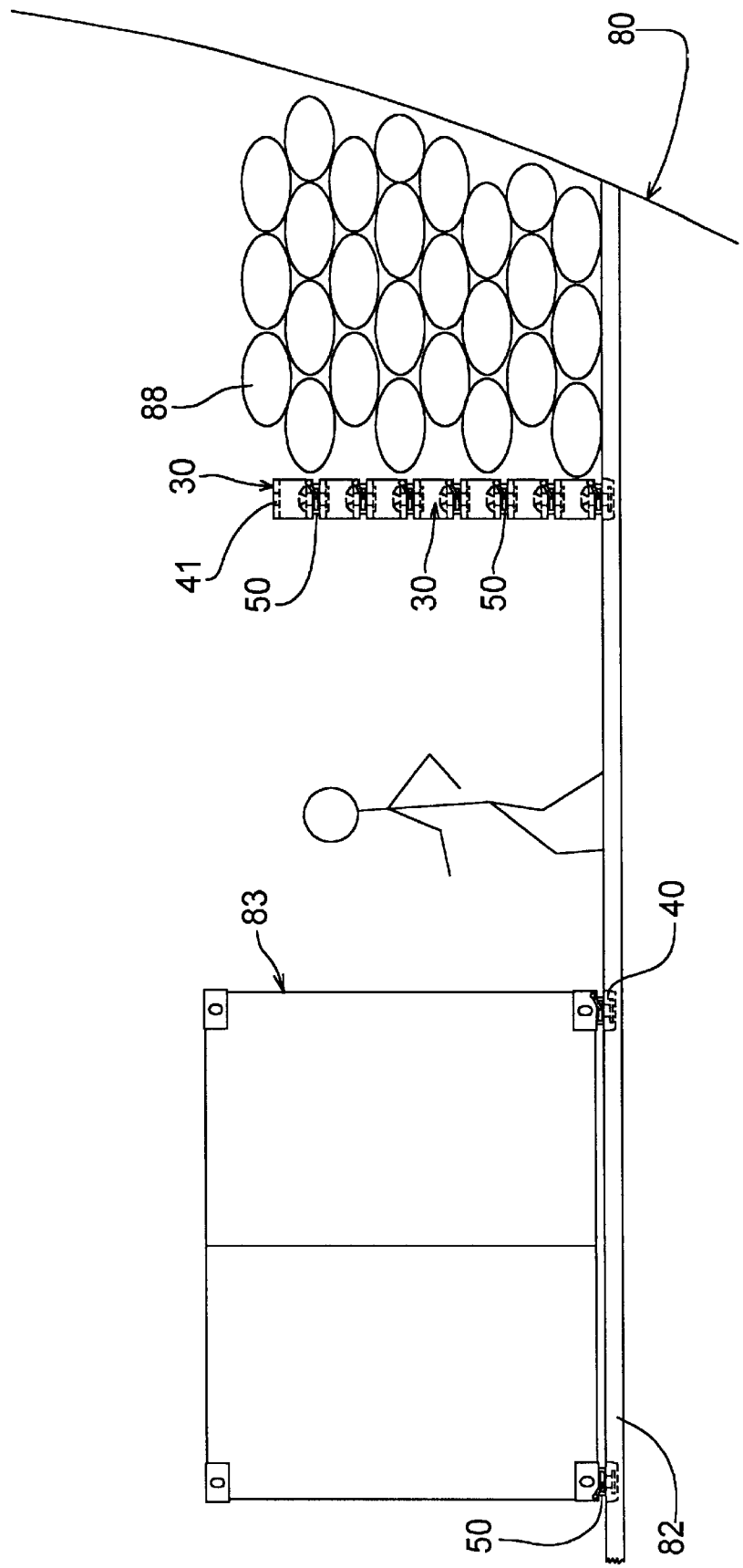
FIG. 17 is an elevation view of a section of a ship showing several apparatus of the present invention, a container, cargo, and the approximate scale relative to a person.

DETAILED DESCRIPTION OF THE INVENTION:

Referring to the drawings, the preferred embodiment of the present invention, cargo lash to bar assembly 34 shown in FIG. 6C, is a beam which is an elongated structural steel tubing member 60 that spans from one twist lock 50 to another twist lock 50, for mounting athwartship or fore to aft on a ship's deck 82, having indexed lock mounting apertures 41 in the bottom mounting and locking surface of structural member 60 toward each end to receive the insertion of twist locks 50 in member 60, that match the spacing of a commercially available freight container 83, to facilitate removable connection of lash to bar 34 to a pair of ISO type twist lock mounting sockets 40 attached to a ship's deck 82. The cargo lash to bar 34 has several D-rings 46 attached to member 60 along the length through which a strap, cable, or chain herein called a lashing 48 may pass for lashing or restraining cargo to. A D-rings 46 consists of any lashing ring 68 and a lashing ring restraining mounting saddle 69 wherein lashing ring 68 is free to pivot, or pivot and rotate, or may be rigidly fastened especially by welding. The lashing ring 68 preferably has a smooth contoured surface to prevent abrasion of the web strap lashings 48 and wire rope lashings 48. The lash to bar 34 has slot 49 or a plurality of slots 49 through the member 60 to facilitate lifting with lift truck's forks. Fork slots 49 are also a hole through which a lashing 48 may be strung for securing and restraining cargo as shown in FIG. 2. There are additional mounting apertures 41 in an opposite parallel surface in the top of member 60 like those in the bottom of member 60 that allow multiple cargo lash to bars 30 or 34 to be mounted and removably connected on top of one another with stacking twist locks 50 for storage or shoring as shown in FIG. 17. This opposite parallel top surface at each end is parallel and noncoplanar to the opposed major mounting surface on the bottom directly below in such a manner that a rotational axis of a twist lock is in line and coaxial with the centerline of the lower and upper noncoplanar mounting apertures. Mounting aperture 41 can also be a hole for lashing through as shown in FIG. 2. Aperture 66 located in the end of end fitting 77 of the lash to bar 30 or 34 is a load bearing and alignment aperture for carrying lash to bar 34 on semi trailer container chassis 95 shown in FIG. 20B, and a lifting point for shipboard and dockside container lifting and handling equipment for lash to bar 34. The secondary use of the aperture 66 is as a hole for lashing through when the lash to bar 34 is fastened to the ships deck 82 as shown in FIG. 2.

For description purposes the mounting points of each end of container 83 are herein referred to as an end cell (2259 millimeter twist lock centers) or side cell (5853 millimeter twist lock centers). FIG. 3 illustrates ship 80 and deck 82 laid out with ISO type twist lock mounting sockets 40. Container 83 is also illustrated. A single athwartship end cell is represented by a line labeled 98, and a single transverse side cell is represented by a line labeled 99.

Figure 4A:
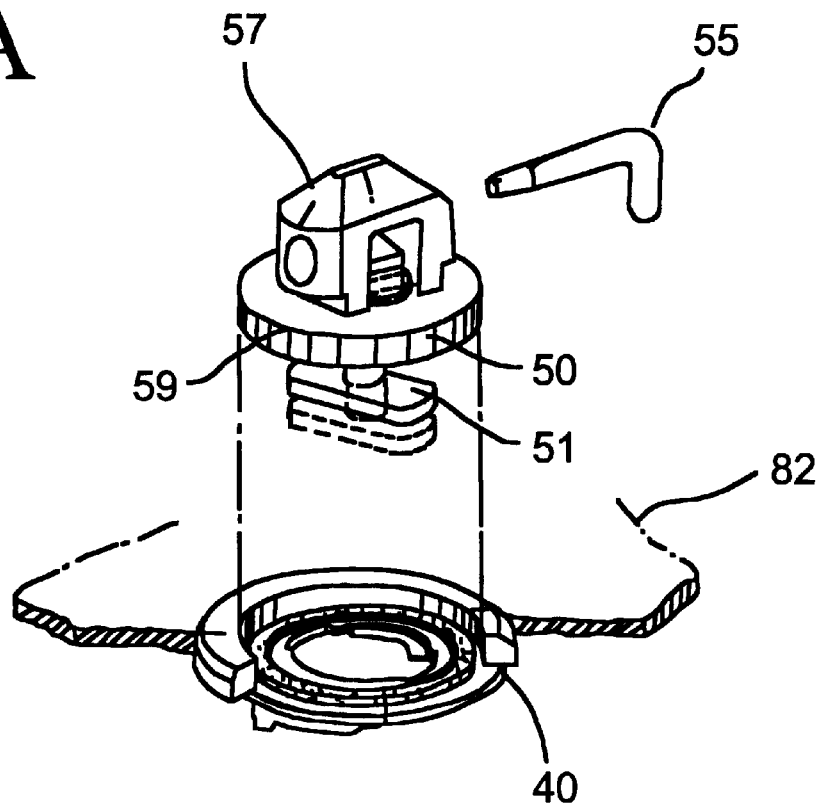
Figure 4B:
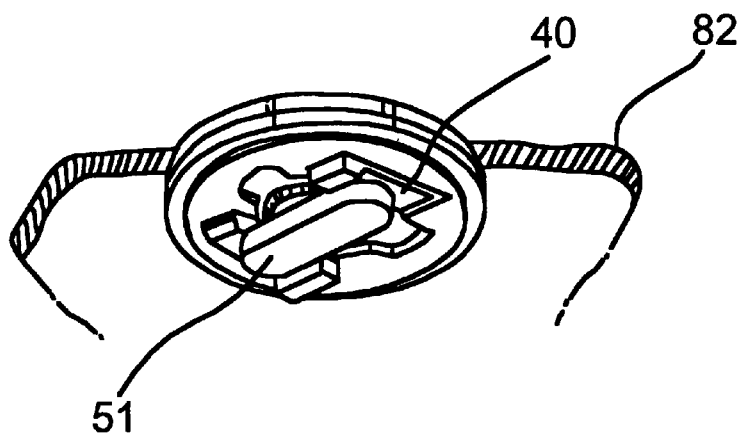
FIG. 4B is a perspective view of the bottom of a deck and socket.

Twist lock 50 is a commonly known commercially available locking bolt devise used in all branches of intermodal shipping. FIGS. 4A show twist lock 50 and FIG. 4B shows deck mounting socket 40 that receives the insertion of twist lock 50. Twist lock 50 has a rotary bolt 51 on one end or both that operates turning rotary locking bolt 51 by means of a hand operated lever 55 ninety degrees relative to a pedestal 57 which is a rigid part of the twist lock body 59 from an unlocked to a locked position. Lash to bar 30 in FIG. 5 is secured to deck 82 removably connected and locked by twist lock 50. This elevation view indicates the contiguous relationship of twist lock 50 resting on deck 82 which is a rigid structure, and inserted and removably connected into twist lock deck socket 40 with lash to bar 30 resting on the twist lock 50 which is inserted in mounting aperture 41 in the lower planar surface of lash to bar 30 and locking bolt 51 of twist lock 50 rotated to the locked position, lash to bar 30 now being held fast to ship's deck 82. Likewise a cargo lash to bar 34, just as a shipping container 83, is unlocked and released by turning hand lever 55 and returning rotary bolt 51 back in alignment with pedestal 57 to the unlocked and free position. Twist locks 50 are versatile and easy to use and come in a variety of deck and bottom base mounting configurations including ISO type base mounting socket 40 of the preferred embodiment, a breech base, and a dove tail base. On semi trailer chassis 95 shown in FIG. 20B, twist locks 50 are a part of the weldment built into the rear of chassis 95.

Figure 7A:
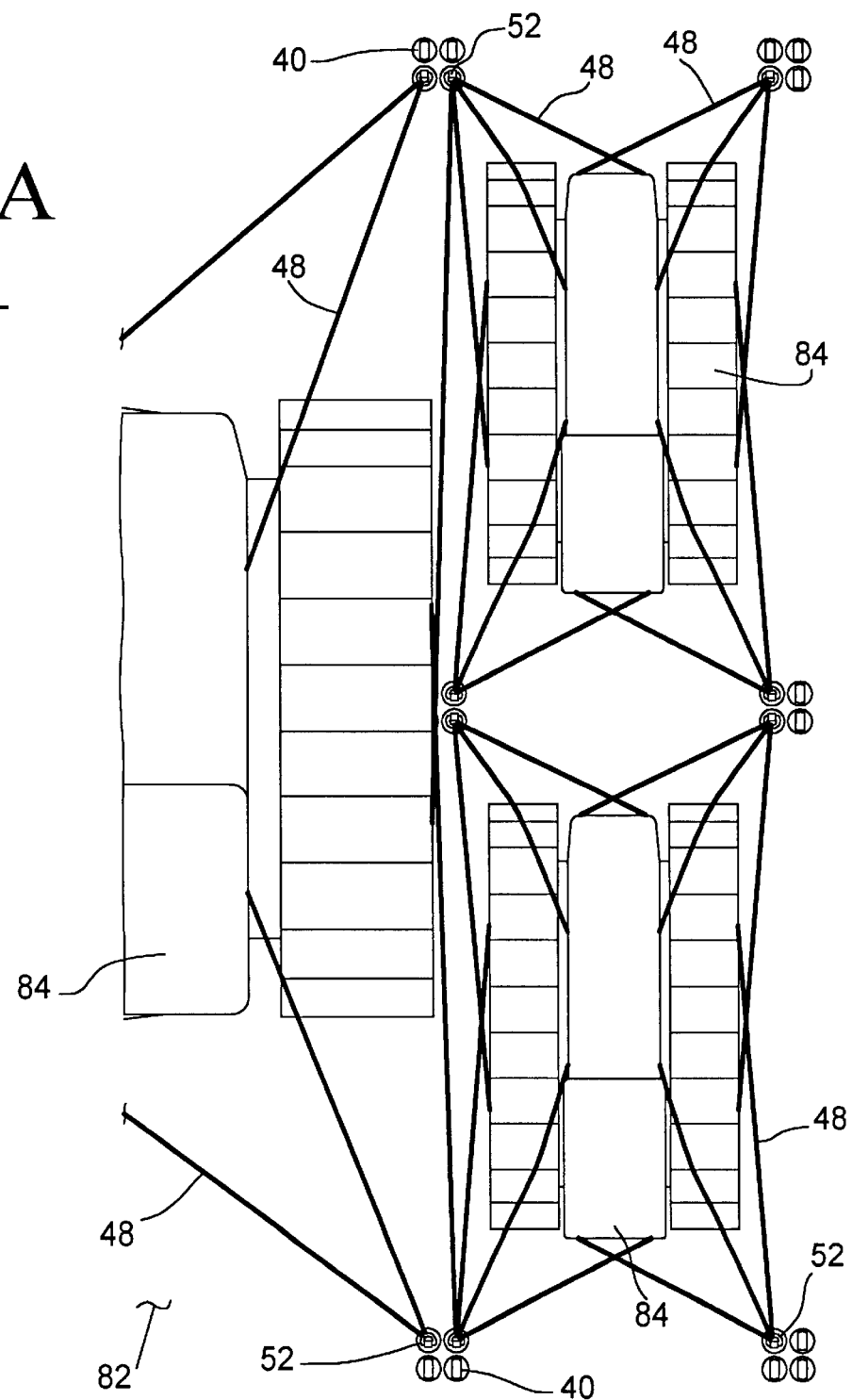
FIG. 7A is a plan view of crawler tractor type mobile equipment lashed to a ship's deck using previous lashing schemes of prior art.
Figure 7B:
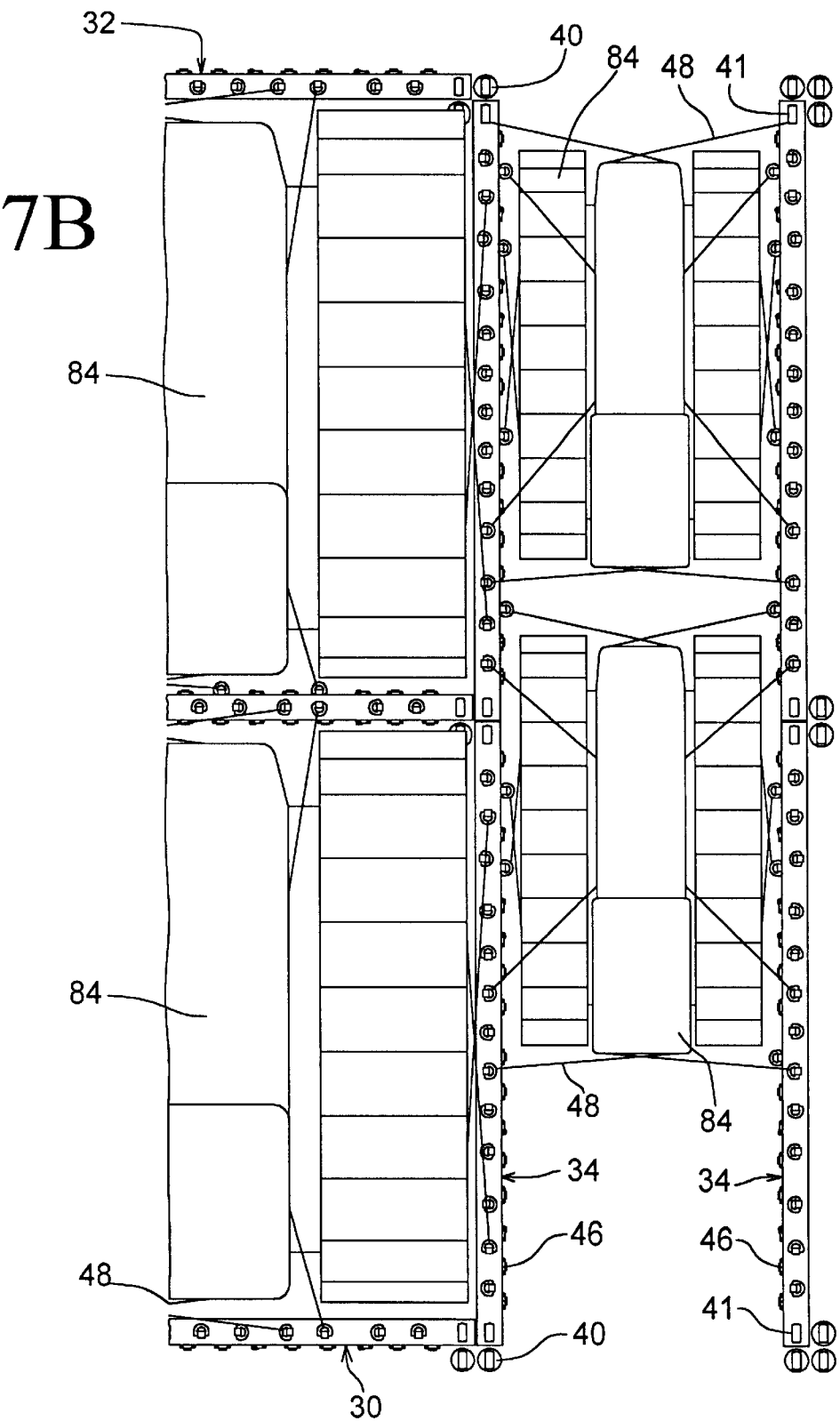
FIG. 7B is a plan view of crawler tractor type mobile equipment lashed to a ship's deck using the present invention.
Figure 9:
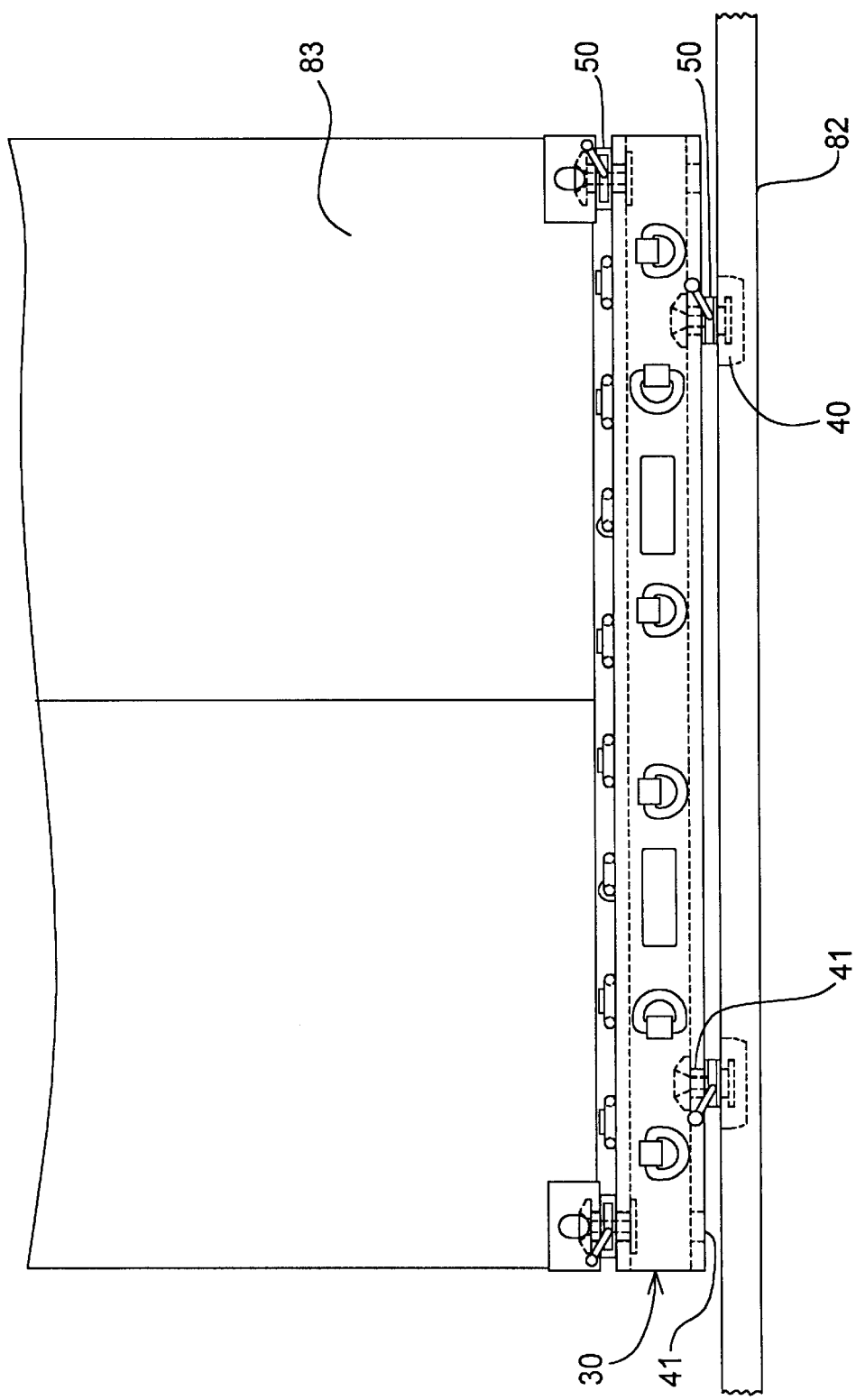
FIG. 9 is a perspective view of the present invention used as an adapter for mounting a container to a structure below the present invention.
Figure 10A:
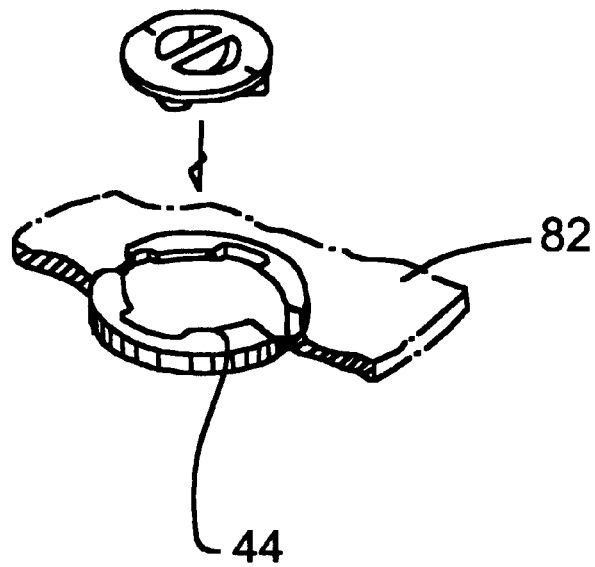
FIG. 10A is a perspective view of a breech base deck socket in the structure of a ship's deck.
Figure 10B:
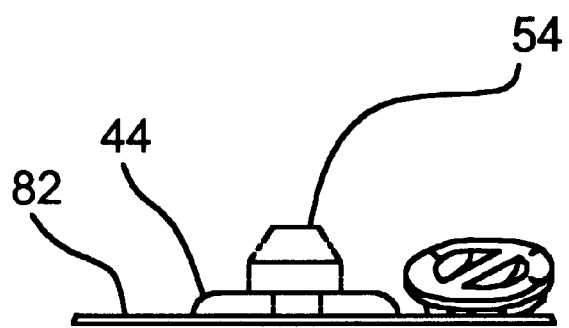
FIG. 10B is a front elevation view of a breech base twist lock mounted in a breech base socket.
Figure 11:
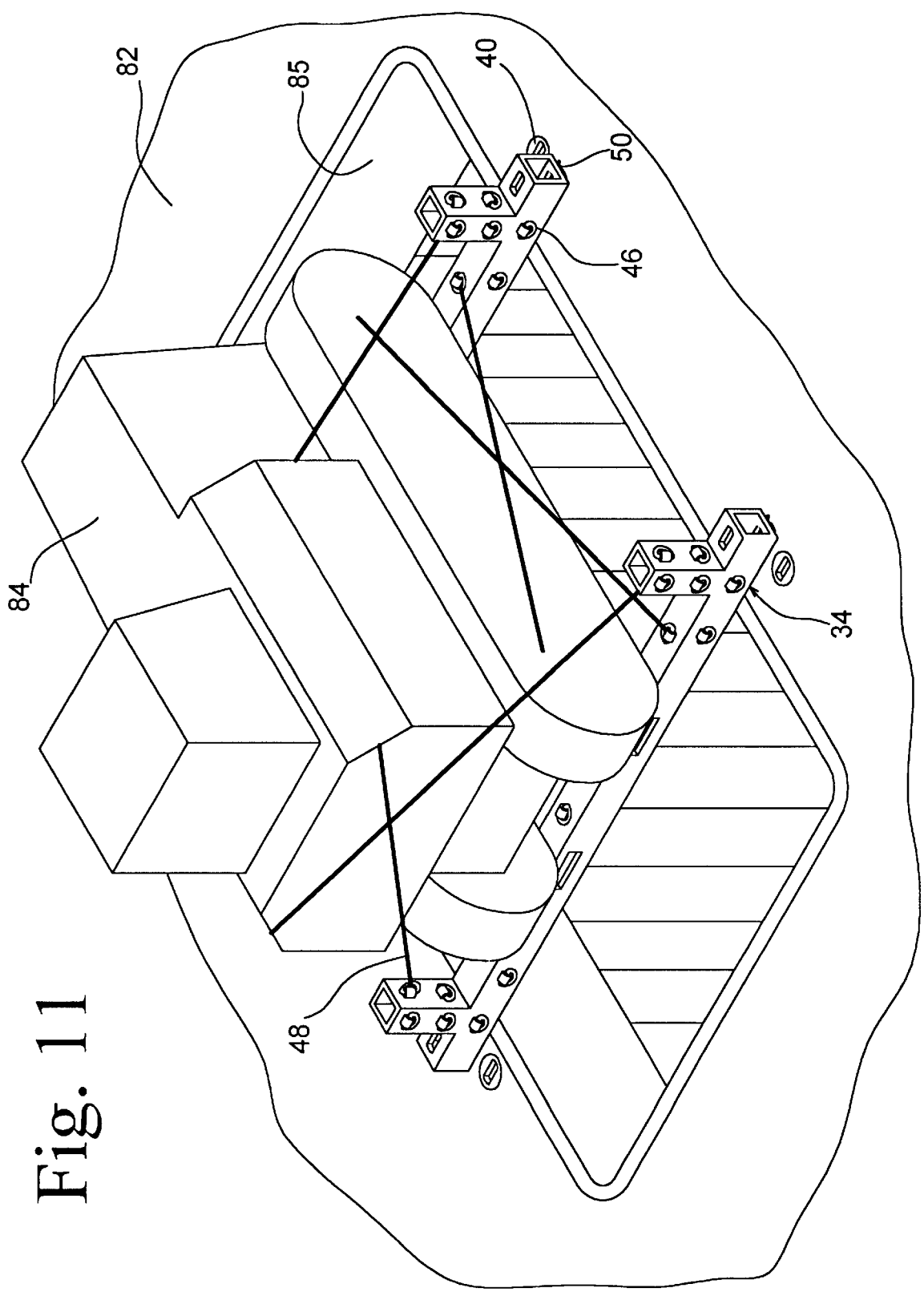
FIG. 11 is a perspective view of a piece of mobile equipment cargo secured to two apparatus of the present invention which spans above a cargo hold opening of a ship's deck.
Figure 14A:
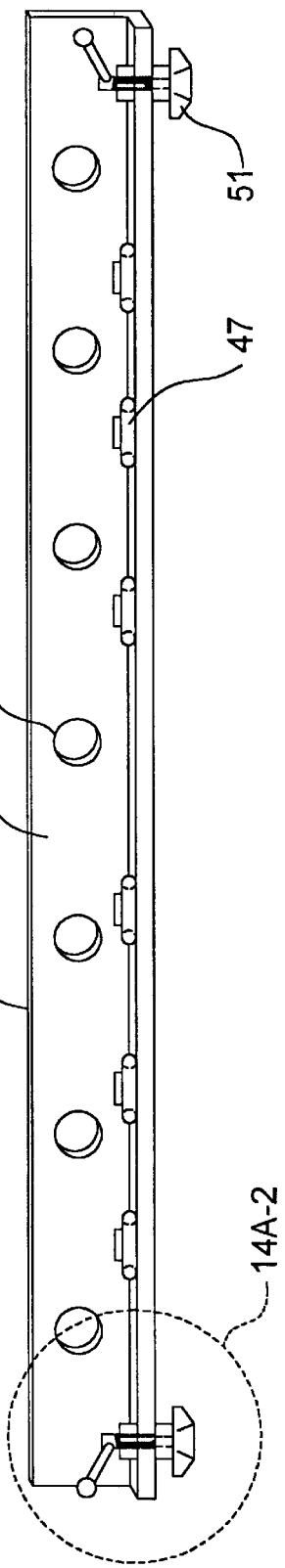
Figures 2, 14A:
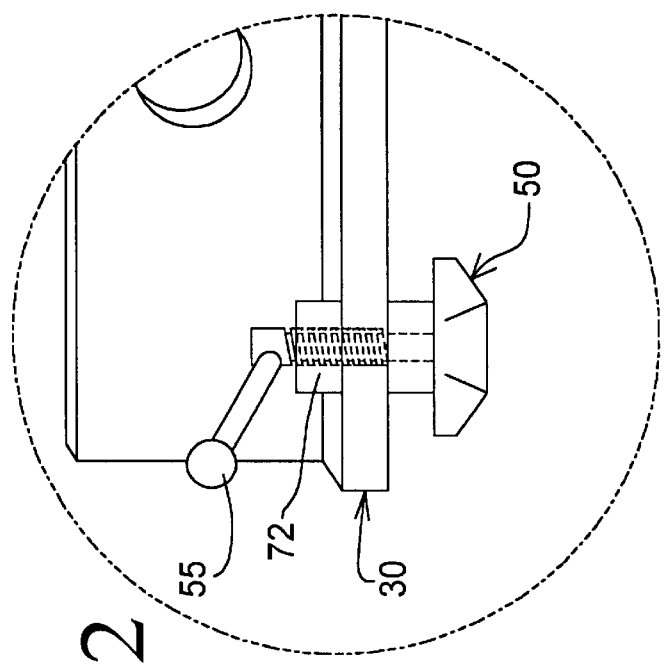
Figure 14B:
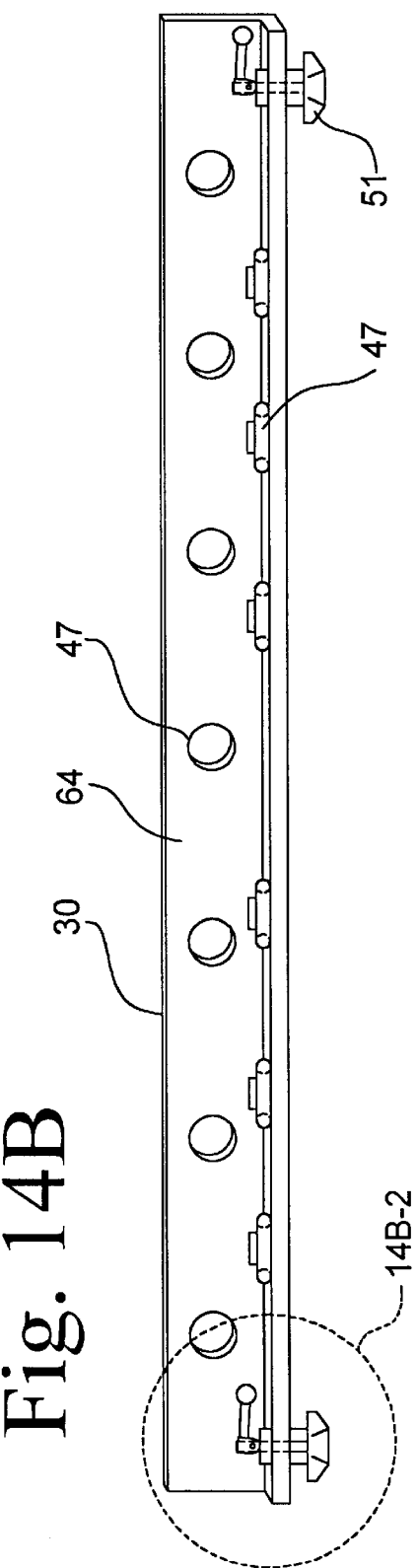
Figures 2, 14B:
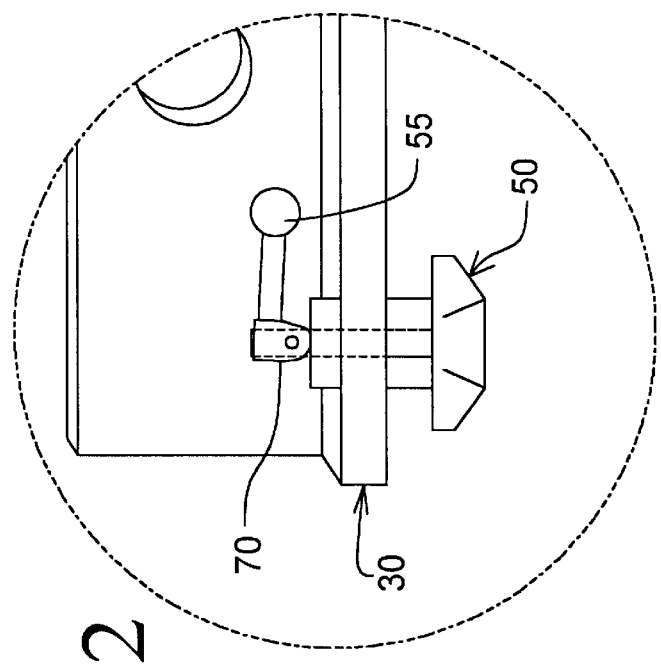
Figure 15:
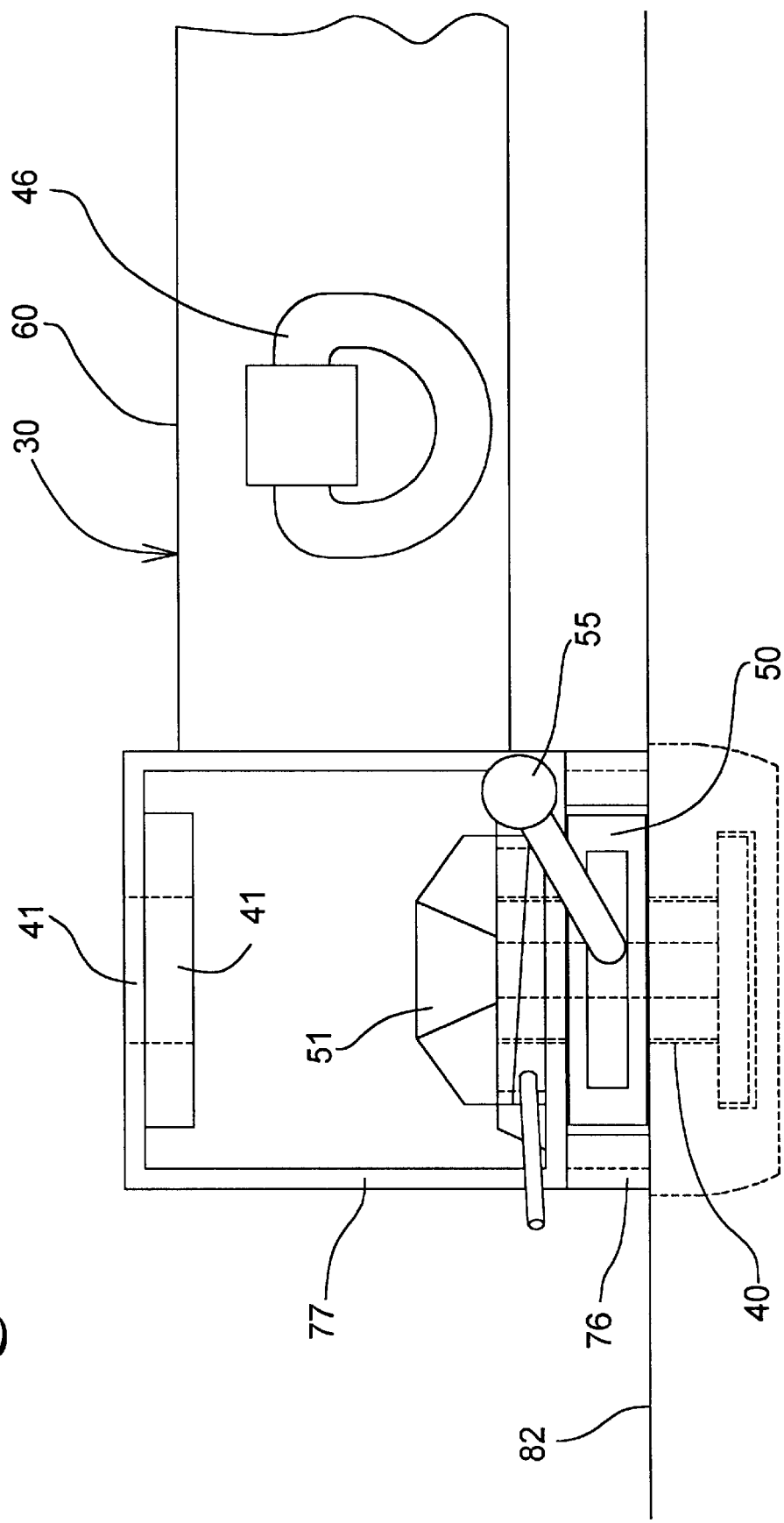
FIG. 15 is a front elevation view an alternate embodiment of the present invention with a tightening wedging mechanism.

End cell 98 cargo lash to bars 30 described above are compact and fit adjacent another lash to bar 30 or 34, shown in FIG. 7B, and are used end to end on ship's deck 82 occupying two adjacent cells athwartship shown in FIG. 6A, or mounted adjacent fore and aft shown in FIG. 6B also occupying two end cells 98 always providing enough clearance to prevent adjacent lash to bars 30 from contacting each other. End cell cargo lash to bars 30 generally mount athwartship starboard to port on ships 80 with the deck 82 built for twist locks 50 and containers 83. Single side cell 99 cargo lash to bar 34 shown in FIG. 6C in twenty foot length configuration is adjacent container 83 in FIG. 2. Apertures 47 in lash to bar 35 FIG. 14A are lashing holes. Special deck cell displacement 98 and 99 lash to bars 30 or 34 are for large and unique cargo and other special configurations.

Lash to bar 34 gives the shipper more cargo room per square foot of deck space by allowing a tighter pack of mobile equipment cargo 84, and cargo 88 in FIG. 2. FIG. 7B shows the gain of deck space from closer cargo 84 proximity using lash to bars 30 and 34 contrasted with problematic traditional lashing scenario shown in FIG. 7A having D-ring twist locks 52 for lashing to deck 82. With lash to bars 30 or 34 each lashing line 48 fastens to an individual Dring 46 or mounting aperture 41.

Figure 1:
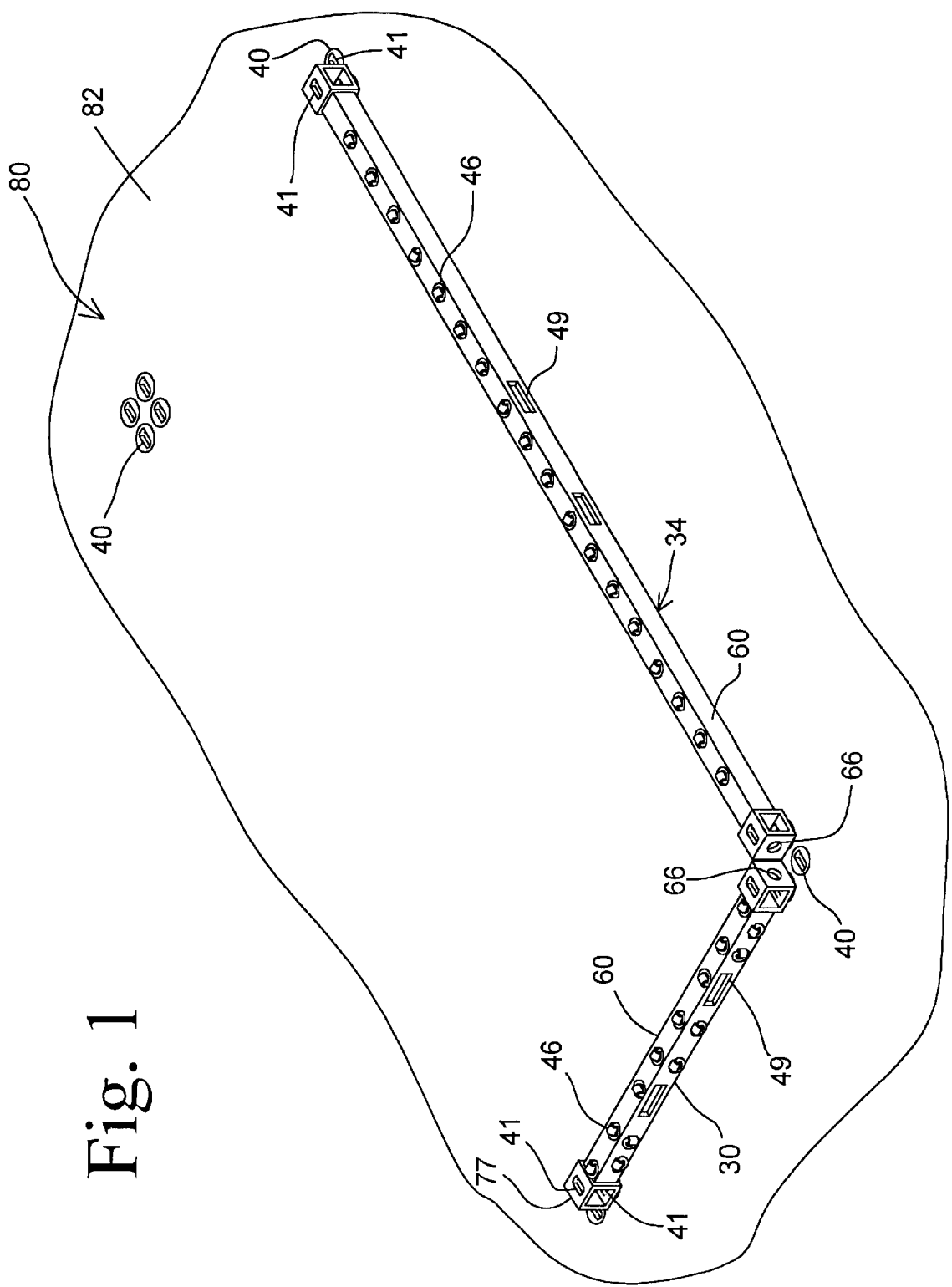
FIG. 1 is a perspective view of a section of a structure that is a ship's deck with two embodiments of the present invention arrayed as if in use.

The preferred embodiment of lash to bar 34 in side cell mounting 99 orientation, lays fore to aft along the twenty or forty foot span of ships deck 82 between deck twist lock mounting sockets 40 in FIG. 1. With a pair of cargo lash to bars 34 in FIG. 2 in this orientation, mobile equipment 84 is readily loaded in between a pair of cargo lash to bars 34 like driving a car into a line in a striped asphalt parking lot leaving a completely clear path of travel in between the pair of lash to bars 34. Using lash to bars 34 as a pair also supports irregular cargo 88 on top of container 83 in FIG. 8, especially on top of a stack of containers 83 loaded in the hold of a container ship.

Figure 12:
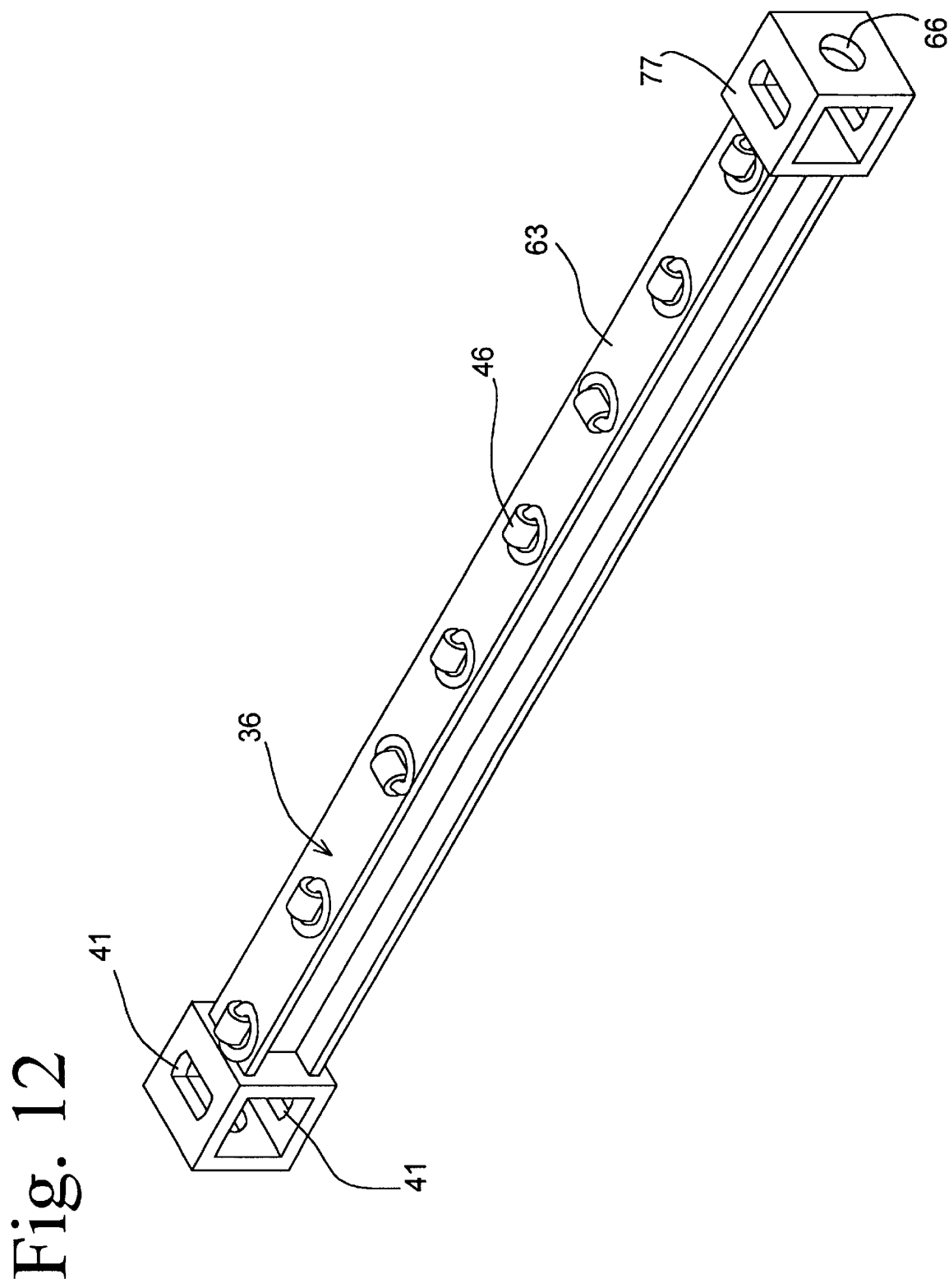
FIGS. 12, 13, 14A, 14B are perspective views of alternate embodiments of the present invention.

The structural steel members 60, 61,62, and 63 comprising lash to bars 30, 34, 35, 36, and 37 are fabricated using shapes of square and rectangular tubing, I, or angle steel as per customer preference and as the application dictates. The strongest lash to bars are fabricated from high tensile steel plate and formed or welded into the aforesaid shapes. T L shaped member 62 is used above deck and does not fill up with rain water or sea water that comes over the deck 82 in rough seas. Structural member 60, or 62 is a continuous beam or weldment of steel or other metal that is fitted with several D-rings 46, and apertures 41, 47, 49, and 66 or just D-rings 46 or just the aforesaid apertures on or through lash to bar 30, 34,35, 36, or 37. Lash to bar 34 is fabricated from a continuous member of square structural steel tubing 60 in FIG. 6C, and indexed apertures 41 are cut into the aforesaid tube. Structural member 63 of a lash to bar 36 in FIG. 12 is a weldment comprised of a length of I beam oriented longitudinally along the elongated longitudinal axis of the lash to bar 36 and a section of structural tubing 77 from which the apertures 41 are cut out of the top and bottom forming an end fitting, that is welded perpendicular to the longitudinal axis of lash to bar 36. The same procedure using a rectangular tubing member 61 longitudinally along the axis of the lash to bar 37, is welded to commercially available container corner castings 78, which are end fittings, shown welded to lash to bar 30 in FIG. 13. It is foreseen that alternate materials and metals could be employed for satisfactory performance especially extrusions of odd shapes. The present invention foresees any such utilization.

Figure 13:
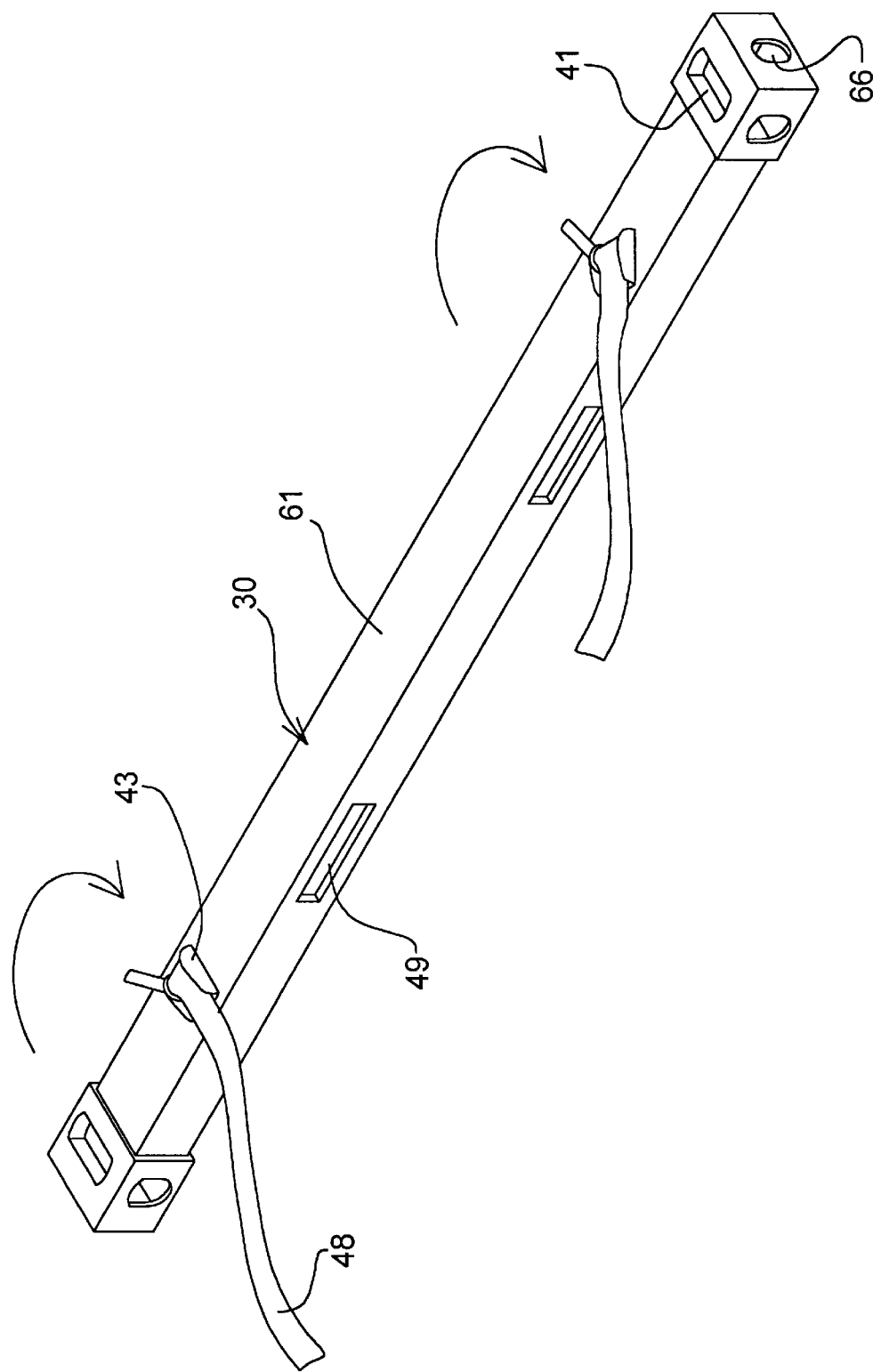

Hand winches 43 are shown in FIG. 13 and are pivoting apertures for lashing to using web strap type lashing lines 48.

Figure 16:
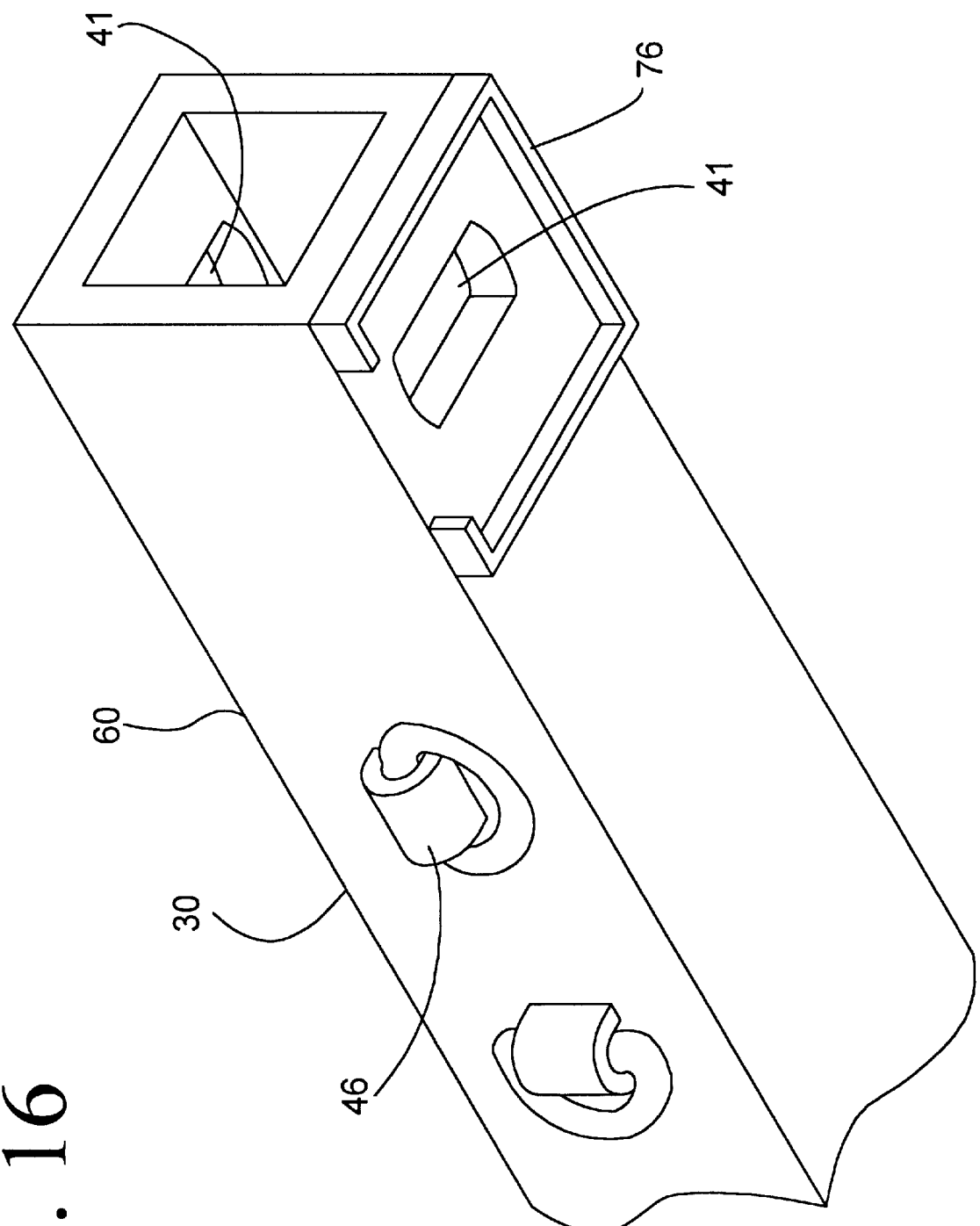
FIG. 16 is a bottom perspective view of the present invention showing a support collar properly installed.

In the preferred embodiment, some applications of cargo lash to bar 30 desire tight removable connection between the ship deck 82 and lash to bar 30 that minimize the clearances inherent to the loose dimensional tolerances of twist-lock 50 between lash to bar 30 and deck 82 a device is employed for this purpose in FIG. 16. The bottom of cargo lash to bar 30 is equipped with optional load transfer brace 76 in FIG. 16 which partially encapsulates twist lock 50 to restrain and inhibit rocking of lash to bar 30, transferring the imposed load into deck 82 rather than a rocking and reversing load on the iron twist lock center pin. FIG. 16 shows a bottom perspective view of lash to bar 30 with load transfer brace 76 installed. Load transfer brace 76 is a collar that is welded to end piece 77 which is a part of the weldment of structural member 60. This collar is a simple stand and is usually fabricated of 1¼" plate or flat bar which is permanently attached. FIG. 6C shows cargo lash to bar 30 equipped with support brace 76 installed, removably connected by means of twist lock 50 to ship's deck 82 wherein load transfer brace 76 impedes rocking action of lash to bar 30 while providing adequate clearance for the use of twist lock 50 and provides room for the locking and releasing hand lever 55 tightening means to function.

Figure 20A:
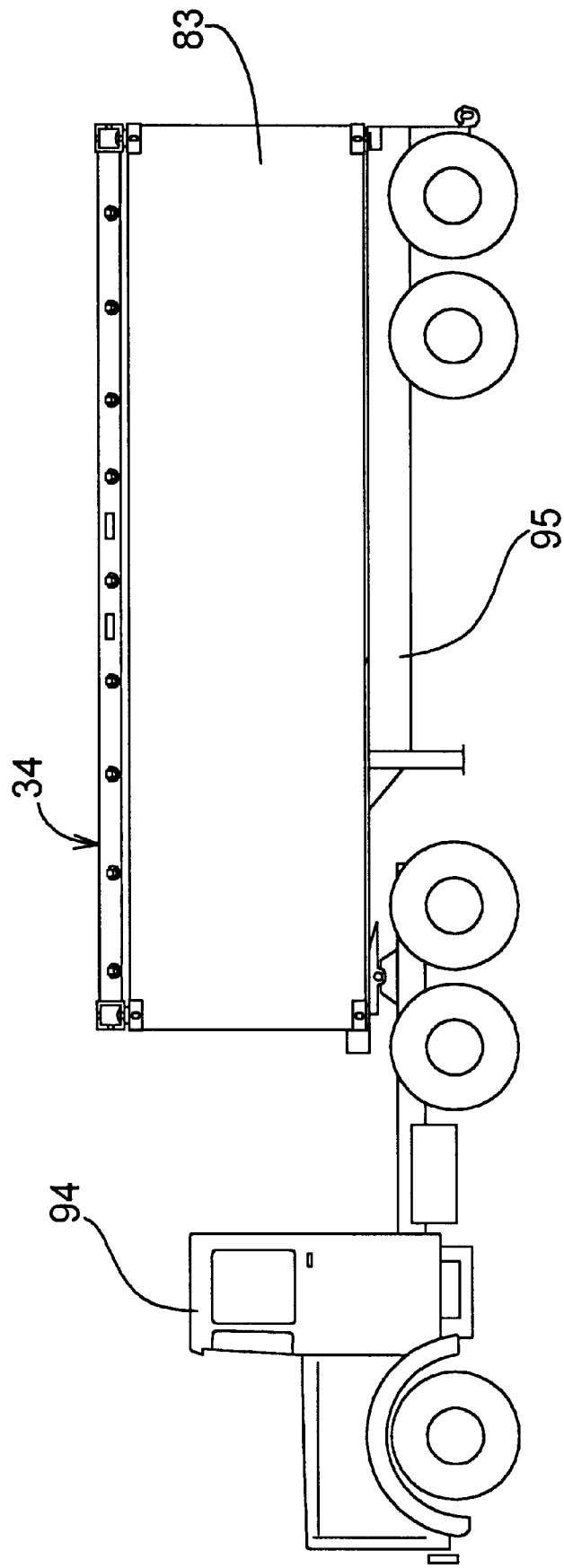
FIG. 20A is an elevation view of the present invention mounted atop a container in an over the road application.
Figure 20B:
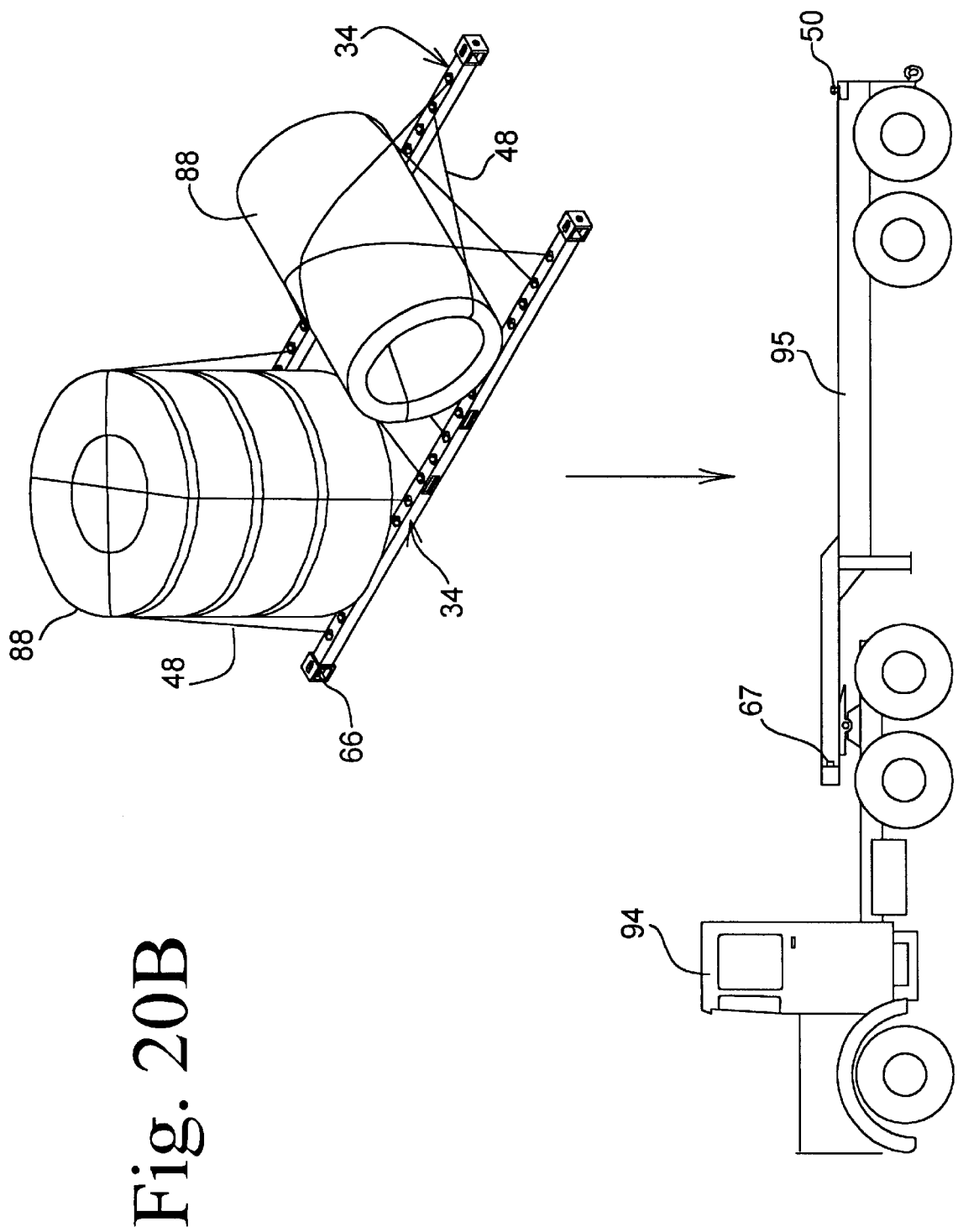
FIG. 20B shows an elevation view of the present invention and a perspective view of the cargo as it would be attached if the cargo and the present invention were attached to the container chassis, and a truck and container chassis in the unloaded and empty configuration, wherein the arrow indicates that the load must be attached to the chassis.
Figure 20C:
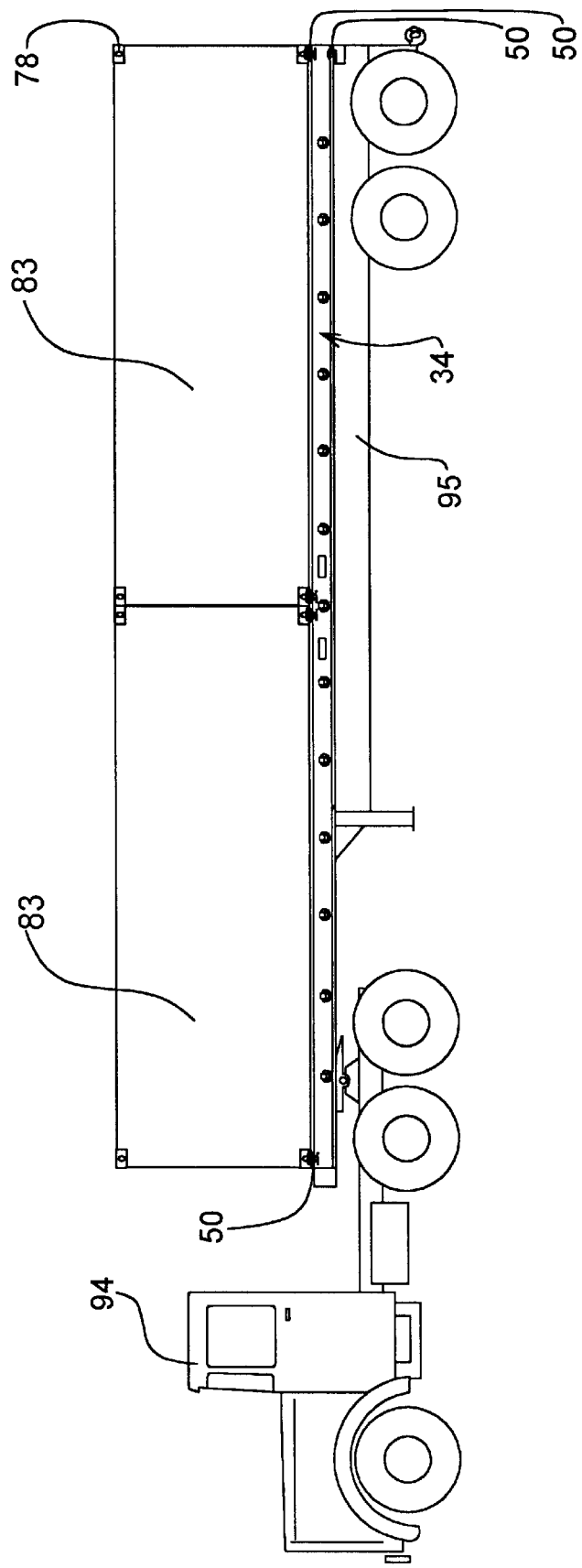
FIG. 20C is an elevation view of a truck container chassis, the present invention, and two containers installed.
Figure 21:
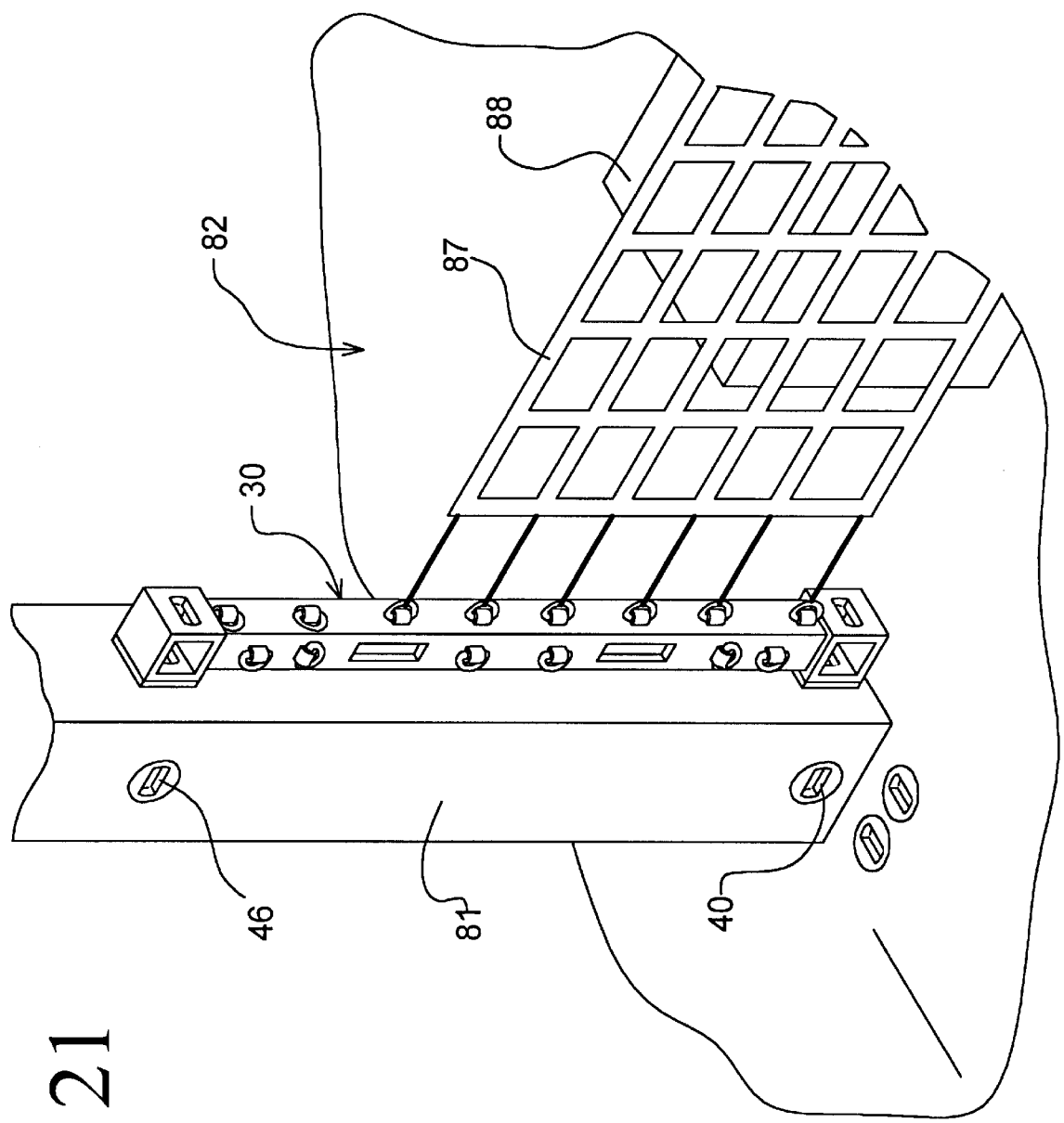
FIG. 21 is a perspective view of the present invention installed vertically onto a bulkhead and a cargo net attached to the present invention.
Figure 22:
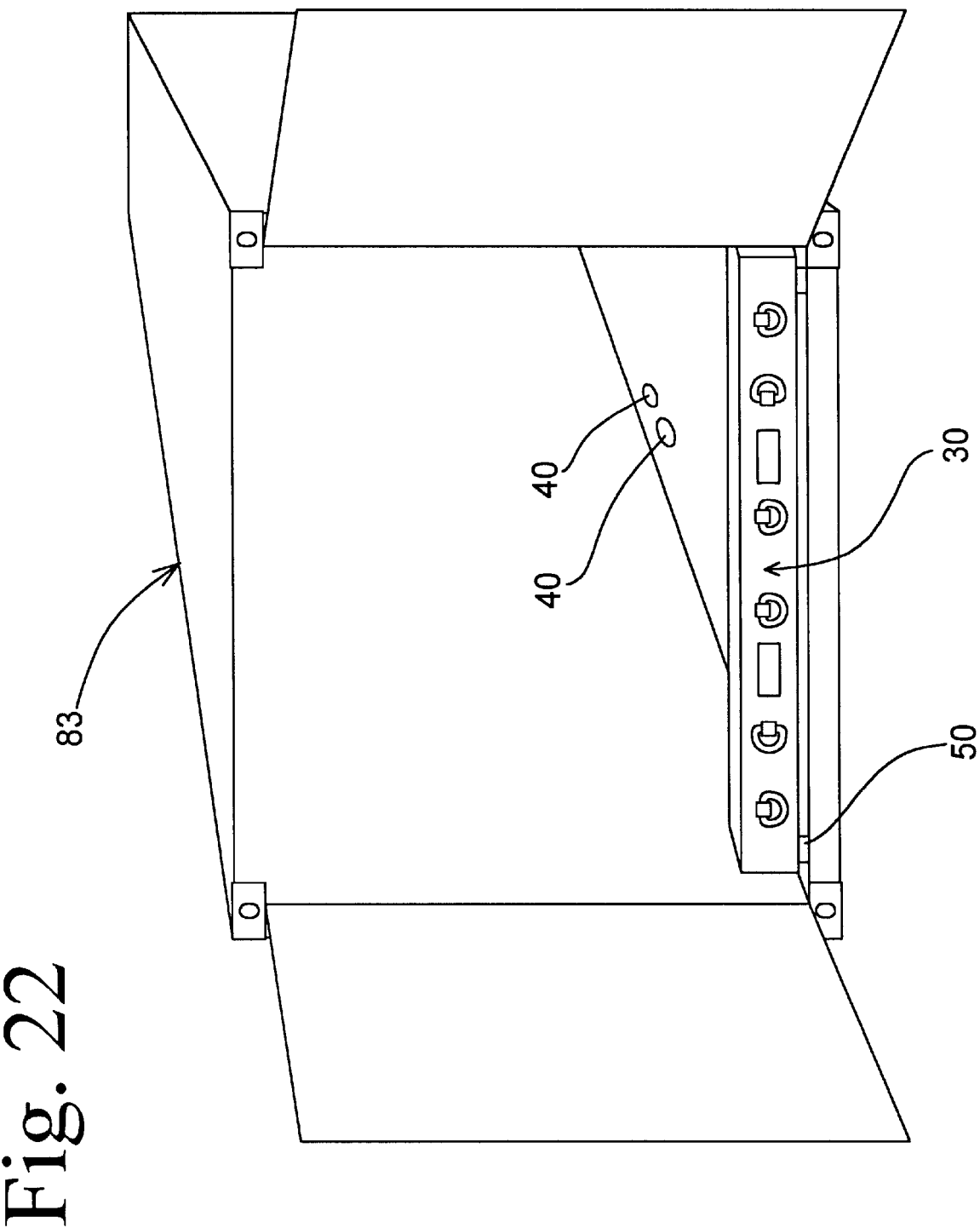
FIG. 22 is a perspective view of a container showing the present invention installed inside of the container.
Figure 23:
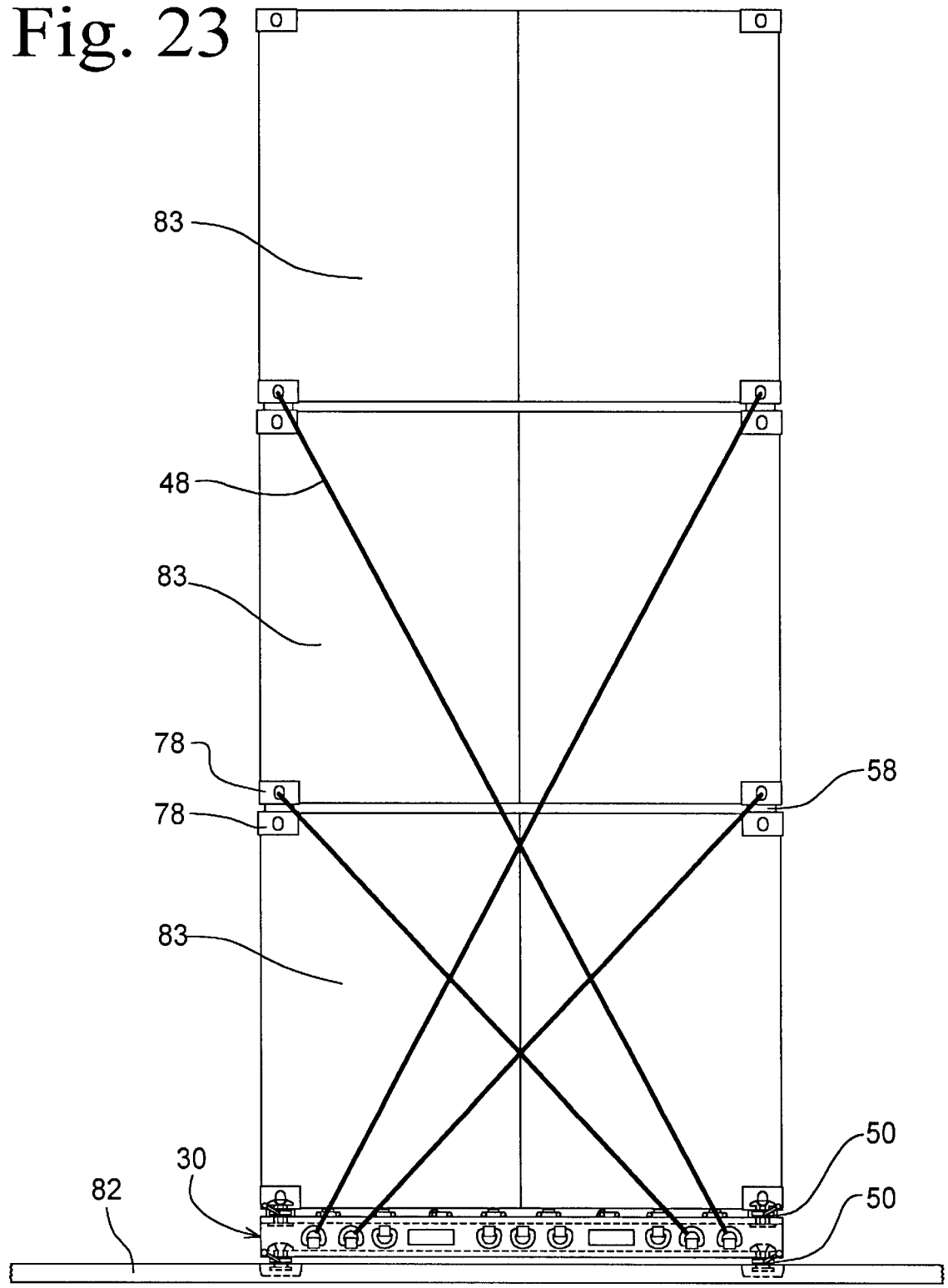
FIG. 23 is an elevation view of the three containers stacked on top of the present invention and the assembly attached to a ship's deck.
Figure 24:
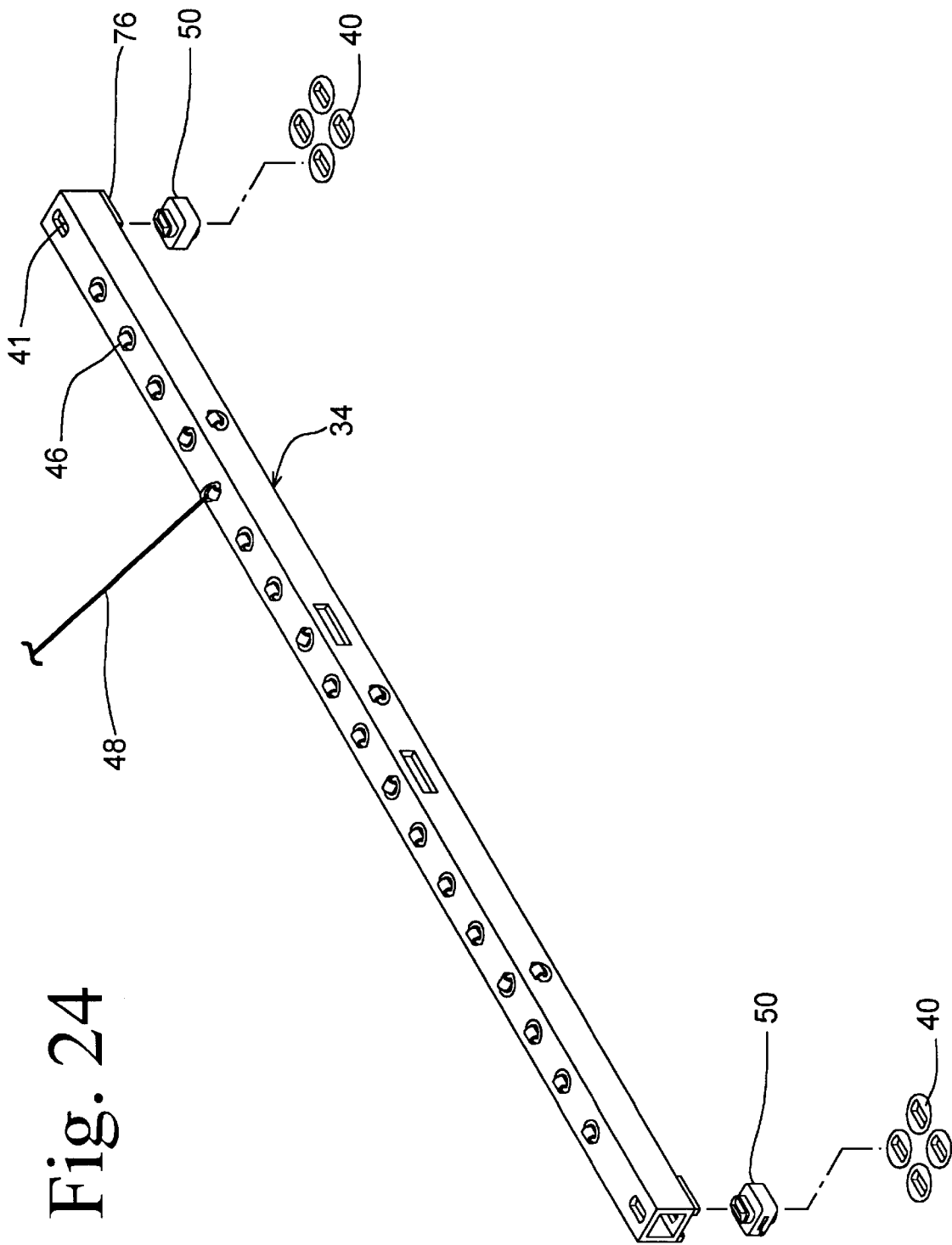
FIG. 24 is an elevation view of the preferred embodiment and is shown as an exploded view.
Figure 25:
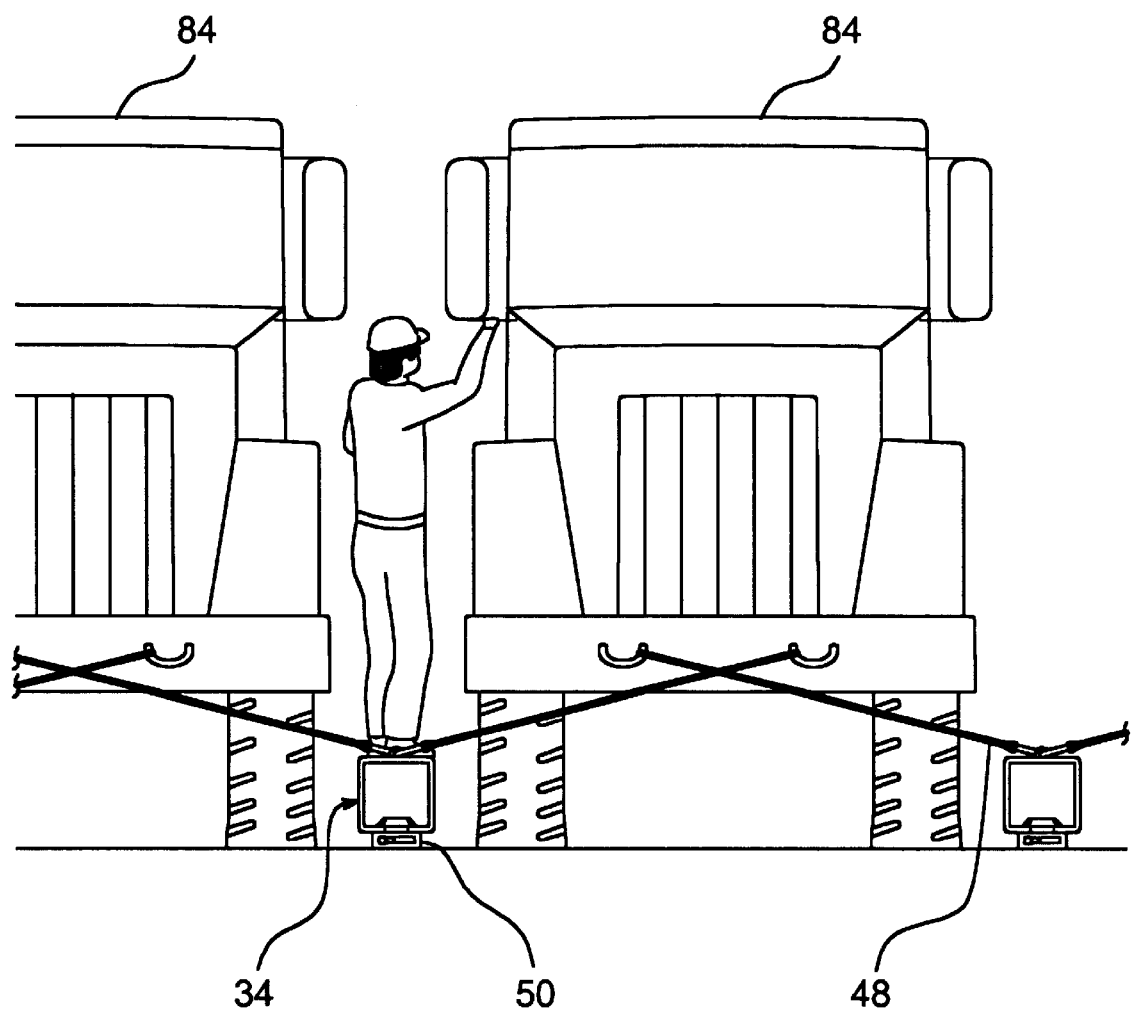
FIG. 25 is an elevation view of the present invention with a man shown in the view for scale and function.

Use of the preferred embodiment in the trucking side of the intermodal shipping industry is shown in FIG. 20A where lash to bar 34 is carried on top of container 83 to a customer's destination, then mounted to container chassis 95 so that truck 94 and bare chassis 95 can be used for back haul loads further expanding the economic potential for truck 94, truck driver, and trailer chassis 95 and makes semi trailer 95 available to valuable back haul loads of irregular shaped cargo 88 shown in FIG. 20B. Lash to bar 34 is removably connected to chassis 95 at the front on holding pins 67 into load bearing holes 66 and at the rear by means of chassis mounted twist lock 50 on the bottom planar surface of lash to bar 34. Aboard ship 80 cargo lash to bar 30 is shown under the end of containers 83 in FIG. 23 where containers 83 are held in place by stacking cones 58, twist locks 50 and restrained and secured with lashings 48 from the bottom of each container 83 in an X pattern for secure lashing resulting in the reclamation of deck space for hauling more containers 83, mobile equipment 84, or cargo 88 as compared to the older lashing schemes.

Figure 18:
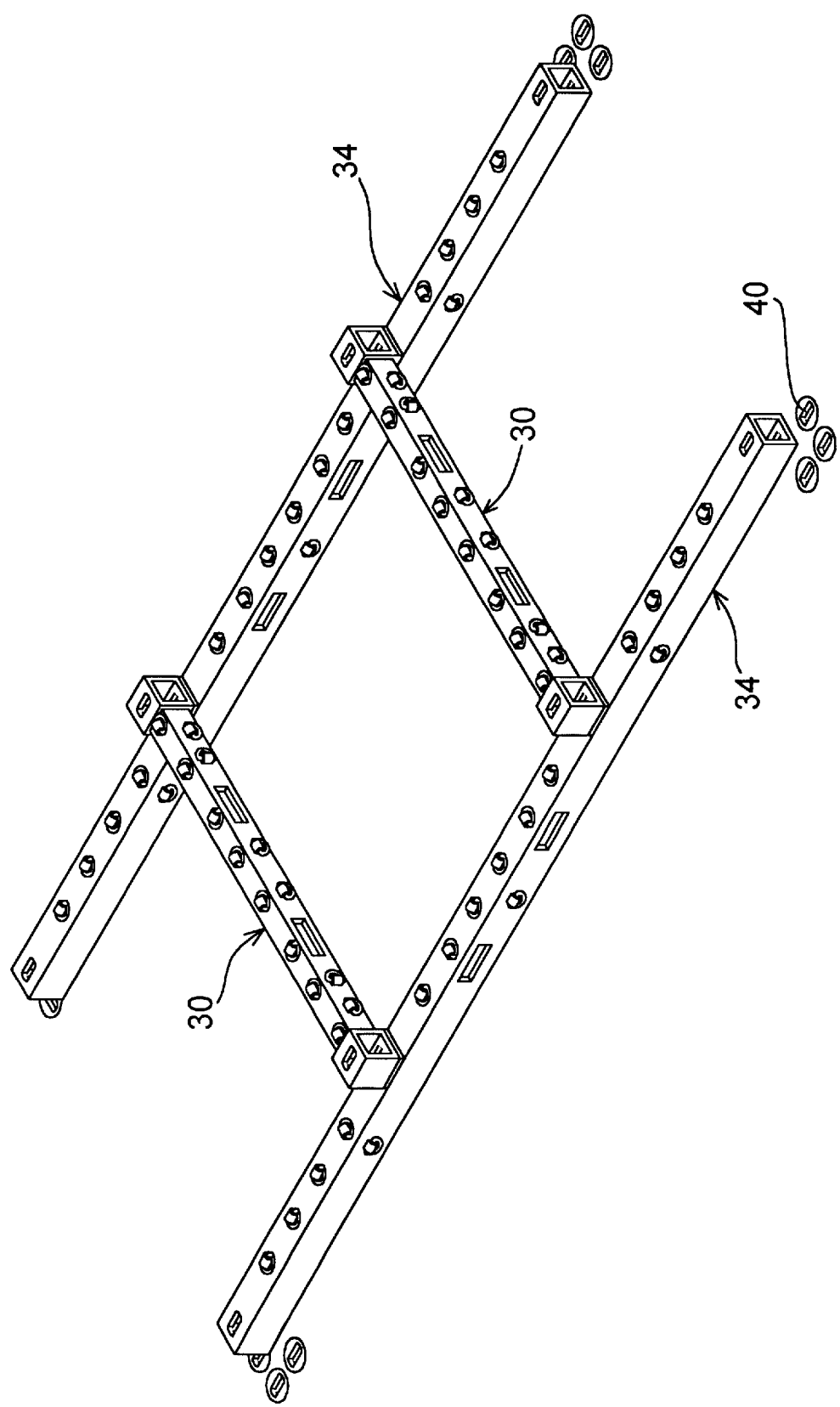
FIG. 18 is a perspective view of four apparatus of the present invention in a configuration for shoring and support for irregular cargo.
Figure 19:
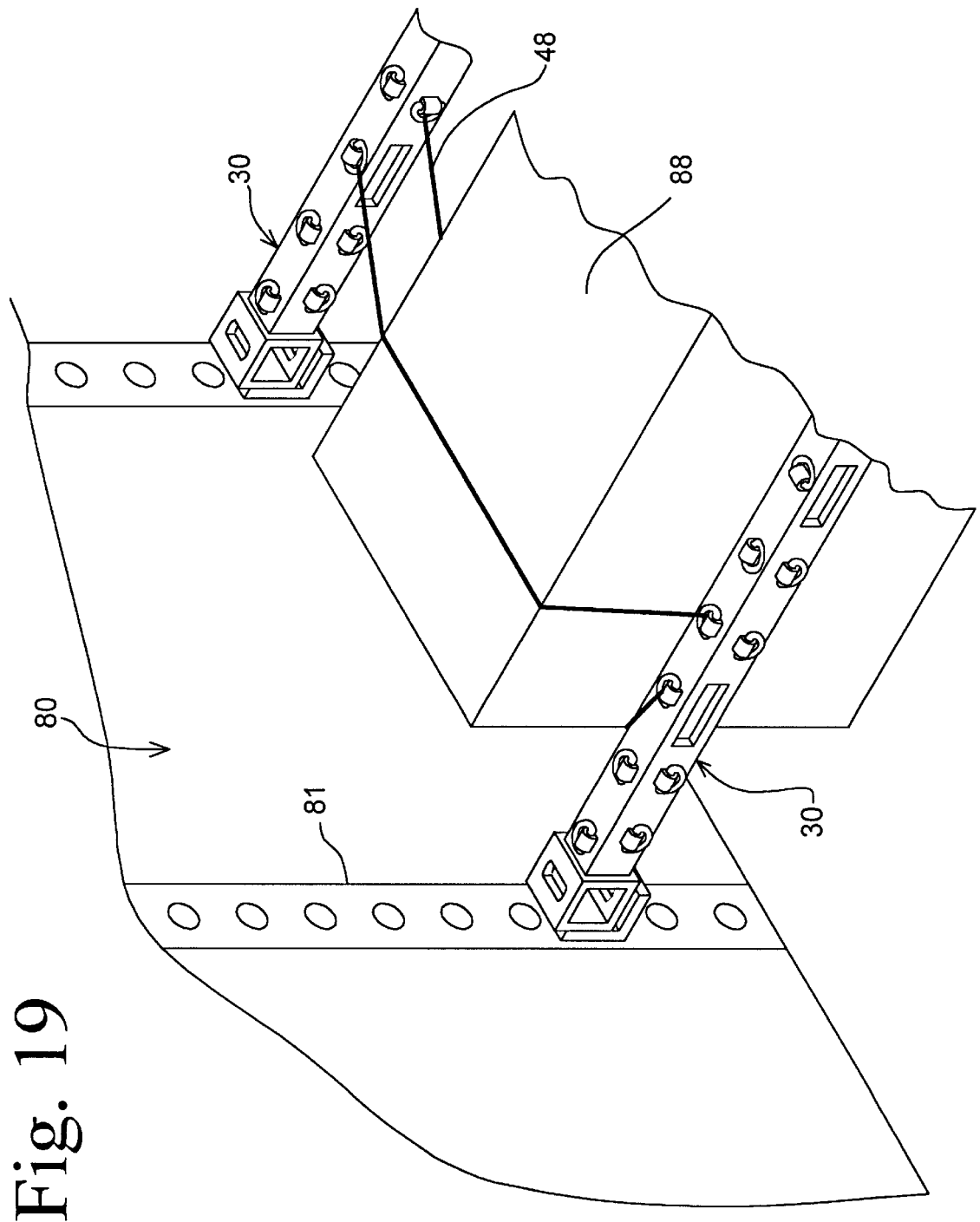
FIG. 19 is a perspective view of the present invention used for shoring and lashing with adapter end fittings and mounted to the walls of a vehicle above a floor surface.

An alternate use of the preferred embodiment is to use the lash to bar 30 as a shoring beam in FIGS. 17 and 18, and stacked one on top of another in FIG. 17 near the area of the sloping side of a ship, or stacked in this configuration for compact storage.

What is mentioned for lash to bars 30 and 34 is not intended to be exclusive and may be applicable to alternate forms of the preferred embodiments 34, 35, 36, and 37.

The foregoing description of the preferred embodiments of the invention has been presented for the purpose of illustration and description. It is not intended to be exhaustive or to limit the invention. It is intended that the scope of the invention not be limited by this detailed description, but rather by the claims appended hereto.

What is claimed is:

1. Cargo restraining apparatus for securing cargo to a load surface with lashing comprising:
   a) at least one rigid member secured to the load surface;
   b) a plurality of fasteners used to attach said rigid member to the load surface;
   c) attaching means positioned oh said rigid member for attaching lashing from the cargo to said rigid member whereby the lashing secures the cargo to the load surface; and
   d) elongated apertures in said rigid member for receiving said fasteners used to attach said rigid member to the load surface.

2. The apparatus of claim 1, wherein the load surface is a surface located on a vehicle.

3. The apparatus of claim 2, wherein said vehicle is a waterborne vessel.

4. The apparatus of claim 2, wherein said vehicle is a land transport vehicle.

5. The apparatus of claim 1, wherein said rigid member is a beam.

6. The apparatus of claim 5, Wherein said beam has an H-shape in cross section.

7. The apparatus of claim 5, wherein said beam has an L-shape in cross section.

8. The apparatus of claim 5, wherein said beam has a rectangular shape in cross section.

9. The apparatus of claim 1, wherein said fasteners are twist locks.

10. The apparatus of claim 1, wherein said attaching means are holes in said rigid member.

11. The apparatus of claim 1, wherein said rigid member has a brace having an outer surface, said brace extending from said member whereby said outer surface of said brace contacts the load surface, said brace inhibiting motion of said rigid member relative to the load surface during movement of the vehicle.

12. The apparatus of claim 11, wherein said- rigid member is a beam.

13. The apparatus of claim 12, wherein said beam has an H-shape in cross section.

14. The apparatus of claim 12, wherein said beam has an L-shape in cross section.

15. The apparatus of claim 12, wherein said beam has a rectangular shape in cross section.

16. The apparatus of claim 12, wherein said fasteners are twist locks.

17. The apparatus of claim 1, which includes two rigid members secured to the load surface, said rigid members arranged substantially in parallel.

18. The apparatus of claim 17, wherein said attaching means are holes in said rigid member.

19. The apparatus of claim 1, wherein said cargo includes a plurality of separate elements.

* * * * *